US007800714B2

United States Patent
Takata

(10) Patent No.: US 7,800,714 B2
(45) Date of Patent: Sep. 21, 2010

(54) LIQUID CRYSTAL DISPLAY AND TELEVISION RECEIVER

(75) Inventor: Yoshiki Takata, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 379 days.

(21) Appl. No.: 12/066,720

(22) PCT Filed: Jun. 7, 2006

(86) PCT No.: PCT/JP2006/311444

§ 371 (c)(1),
(2), (4) Date: Mar. 13, 2008

(87) PCT Pub. No.: WO2007/039958

PCT Pub. Date: Apr. 12, 2007

(65) Prior Publication Data

US 2009/0153780 A1    Jun. 18, 2009

(30) Foreign Application Priority Data

Sep. 30, 2005    (JP)    ............... 2005-289430

(51) Int. Cl.
G02F 1/1347    (2006.01)
G02F 1/1333    (2006.01)
H04N 9/30    (2006.01)
(52) U.S. Cl. ............... 349/74; 349/161; 348/791
(58) Field of Classification Search ............... 349/74, 349/161; 348/791
See application file for complete search history.

(56) References Cited

U.S. PATENT DOCUMENTS

| 5,070,326 | A | 12/1991 | Yoshimoto et al. |
| 5,250,932 | A | 10/1993 | Yoshimoto et al. |
| 5,303,073 | A | 4/1994 | Shirota et al. |
| 6,512,564 | B1 | 1/2003 | Yoshida et al. |
| 6,661,488 | B1 | 12/2003 | Takeda et al. |
| 6,724,452 | B1 | 4/2004 | Takeda et al. |
| 7,167,224 | B1 | 1/2007 | Takeda et al. |
| 7,224,421 | B1 | 5/2007 | Takeda et al. |
| 7,253,861 | B2 | 8/2007 | Niiyama et al. |
| 2004/0119924 | A1 | 6/2004 | Takeda et al. |
| 2004/0183972 | A1 | 9/2004 | Bell |
| 2004/0252257 | A1 | 12/2004 | Wen et al. |

(Continued)

FOREIGN PATENT DOCUMENTS

JP    63-025629 A    2/1988

(Continued)

OTHER PUBLICATIONS

Nakai et al.; "Liquid Crystal Display and Television Receiver"; U.S. Appl. No. 11/990,072, filed Feb. 6, 2008.
Shiomi: "Liquid Crystal Display Device and Television Receiver," U.S. Appl. No. 12/225,183, filed Sep. 16, 2008.
Maeda et al.: "Liquid Crystal Display Device, Its Driving Method and Electronic Device," U.S. Appl. No. 12/225,247, filed Sep. 17, 2008.
Official communication issued in counterpart International Application No. PCT/JP2006/311444, mailed on Jul. 25, 2006.

*Primary Examiner*—Mike Qi
(74) *Attorney, Agent, or Firm*—Keating & Bennett, LLP

(57) ABSTRACT

A liquid crystal display includes a first liquid crystal panel and a second liquid crystal panel stacked on each other; and polarizers provided to the panels, together with a polarizer of an adjacent panel, arranged to define a crossed Nicols. When the first liquid crystal panel produces a display from a first display signal, the second liquid crystal panel produces a display from a second display signal obtained from the first display signal. Between a framework and drivers provided to the first liquid crystal panel and the second liquid crystal panel, heat conducting members are arranged to transfer heat from the drivers to the framework so as to improve luminance when two liquid crystal panels are stacked and achieve high display quality.

19 Claims, 38 Drawing Sheets

U.S. PATENT DOCUMENTS

| | | |
|---|---|---|
| 2005/0041179 A1 | 2/2005 | Suzuki |
| 2007/0064187 A1 | 3/2007 | Takeda et al. |
| 2008/0303995 A1 | 12/2008 | Shimodaira et al. |
| 2009/0046212 A1* | 2/2009 | Tsubata et al. .............. 348/790 |
| 2009/0051707 A1* | 2/2009 | Hirata et al. ................ 345/690 |
| 2009/0109351 A1* | 4/2009 | Shiomi ....................... 348/790 |
| 2009/0147186 A1* | 6/2009 | Nakai et al. .................. 349/74 |

FOREIGN PATENT DOCUMENTS

| | | |
|---|---|---|
| JP | 64-049021 A | 2/1989 |
| JP | 01-277215 A | 11/1989 |
| JP | 01-309024 A | 12/1989 |
| JP | 02-000023 A | 1/1990 |
| JP | 4-79330 U | 7/1992 |
| JP | 05-088197 A | 4/1993 |
| JP | 06-306266 A | 11/1994 |
| JP | 08-305301 A | 11/1996 |
| JP | 11-167106 A | 6/1999 |
| JP | 11-271709 A | 10/1999 |
| JP | 2001-188120 A | 7/2001 |
| JP | 2002-090536 A | 3/2002 |
| JP | 2003-279963 A | 10/2003 |
| JP | 2005-164692 A | 6/2005 |

* cited by examiner

Viewing Angle vs. Parallel Transmittance
[Azimuth = 45° (550 nm)]

Viewing Angle vs. Cross Transmittance [Azimuth = 45° (550 nm)]

Viewing Angle vs. Contrast Transmittance [Azimuth = 45° (550 nm)]

LIQUID CRYSTAL DISPLAY AND TELEVISION RECEIVER

BACKGROUND OF THE INVENTION

1. Field of the Invention

The present invention relates to liquid crystal displays with improved contrast and television receivers incorporating such liquid crystal displays.

2. Description of the Related Art

Various techniques exist for improving the contrast of a liquid crystal display. The following are examples disclosed in patent documents 1 to 7.

Patent document 1 discloses a technique of optimizing the relative amount and surface area ratio of the yellow component of pigment in a color filter to improve the contrast ratio. The technique successfully addresses the problem of poor contrast ratio of a liquid crystal display caused by pigment molecules in the color filter scattering and depolarizing polarized light. Patent document 1 states that the contrast ratio of a liquid crystal display improves from 280 to 420.

Patent document 2 discloses a technique of increasing the transmittance and polarizing capability of a polarizer to improve the contrast ratio. Patent document 2 states that the contrast ratio of a liquid crystal display improves from 200 to 250.

Patent documents 3 and 4 disclose a technique for improving contrast in a guest-host mode which exploits absorption of light by a dichroic pigment. Patent documents 3 and 4 disclose a method of improving contrast by way of a structure in which two guest-host liquid crystal cells are provided with a quarter-wave plate interposed between the two cells.

Patent document 3 discloses omission of polarizers. Patent document 4 discloses a liquid crystal display element in which a dichroic pigment is mixed with a liquid crystal used in dispersive liquid crystal mode. Patent document 4 describes a contrast ratio of 98.

The techniques disclosed in patent documents 3 and 4 show relatively low contrast when compared to the other schemes. To further improve the contrast, various methods may be available: the light absorption by the dichroic pigment may be improved, the pigment content increased, or the thickness of the guest-host liquid crystal cell(s) increased. All these methods however lead to new problems, such as technical problems, poor reliability, and poor response properties.

Patent documents 5 and 6 disclose a method of improving contrast by an optical compensation scheme. The documents describe a liquid crystal panel and a liquid crystal display panel provided between a pair of polarizers. The liquid crystal panel performs optical compensation.

Patent document 5 improves a retardation contrast ratio from 14 to 35 in STN mode using a display cell and a liquid crystal cell which is provided to perform optical compensation.

Patent document 6 provides a liquid crystal cell for optical compensation. The cell compensates for wavelength dependence of a liquid crystal display cell in, for example, TN mode when the display cell is displaying black.

The techniques disclosed in the patent documents achieve a less-than-2 fold increase in contrast ratio.

Another contrast enhancing technique is disclosed in patent document 7, for example. The document teaches a complex liquid crystal display in which two liquid crystal panels are stacked in such a manner that polarizers form crossed Nicols.

Patent document 1: Japanese Unexamined Patent Publication (Tokukai) 2001-188120 (published Jul. 10, 2001)

Patent document 2: Japanese Unexamined Patent Publication (Tokukai) 2002-90536 (published Mar. 27, 2002)

Patent document 3: Japanese Unexamined Patent Publication 63-25629/1988 (Tokukaisho 63-25629; published Feb. 3, 1988)

Patent document 4: Japanese Unexamined Patent Publication 5-2194/1993 (Tokukaihei 5-2194; published Jan. 8, 1993)

Patent document 5: Japanese Unexamined Patent Publication 1-49021/1989 (Tokukaihei 1-49021; published Feb. 23, 1989)

Patent document 6: Japanese Unexamined Patent Publication 2-23/1990 (Tokukaihei 2-23; published Jan. 5, 1990)

Patent document 7: Japanese Unexamined Patent Publication 5-88197/1993 (Tokukaihei 5-88197; published Apr. 9, 1993)

Patent document 7 is aimed at achieving increased gray levels by stacking two liquid crystal panels without increasing the gray levels of the individual liquid crystal panels; no specific measures are taken to facilitate discharge of heat stored in the liquid crystal panel itself when an increased amount of light is shone onto the panel to improve luminance. That impedes increasing the amount of light shone onto the liquid crystal panel; the luminance of the display screen cannot be sufficiently raised, which could seriously degrade display quality.

SUMMARY OF THE INVENTION

In order to overcome the problems described above, preferred embodiments of the present invention improves luminance of two liquid crystal panels, one disposed on top of the other, so as to realize a liquid crystal display with high display quality.

The liquid crystal display in accordance with a preferred embodiment of the present invention includes: two or more stacked liquid crystal panels; polarized light absorbing layers forming crossed Nicols across the liquid crystal panels; a first liquid crystal panel arranged to produce a display from a first display signal; a second liquid crystal panel arranged to produce a display from a second display signal obtained from the first display signal, where one of adjacent liquid crystal panels of the stacked liquid crystal panels is the first liquid crystal panel, and the other is the second liquid crystal panel; and a cooling device arranged to cool the liquid crystal display.

According to the structure, two or more liquid crystal panels are stacked, and polarized light absorbing layers are arranged to form crossed Nicols across the liquid crystal panels. Therefore, in the front direction, light leaks along the transmission axis of the polarized light absorbing layer, but the leak is blocked off by the absorption axis of the next polarized light absorbing layer. At oblique angles, if the Nicol angle, or the angle at which the polarization axes of the adjacent polarized light absorbing layers intersect, deviates somewhat from an original design, no increase in light intensity due to light leakage occurs. Black is less likely to lose its depth with an increase in the Nicol angle at oblique viewing angles.

From the foregoing, when two or more liquid crystal panels are stacked, there are provided at least three polarized light absorbing layers. The three polarized light absorbing layers arranged to form crossed Nicols allow for a greatly improved shutter performance both in the front and oblique directions. That in turn greatly improves contrast.

Besides, the cooling device, which is arranged to cool down the liquid crystal display, prevents heat from building up in the liquid crystal display.

Generally, the lighting system in the liquid crystal display is the dominant heat source increasing the temperature of the liquid crystal display. The heat generated by the lighting system raises the temperature of the entire liquid crystal display. If the radiation intensity of the lighting system is increased to achieve improved luminance in the liquid crystal display, the liquid crystal panel absorbs more light and heats up more, which could make the liquid crystal panel less reliable.

The provision of the panel cooling device arranged to cool the liquid crystal display as in the structure above prevents increases in the temperature of the liquid crystal panel itself which could otherwise result from increased light intensity of the lighting system. That allows for improved luminance in the liquid crystal display.

Therefore, if the liquid crystal display is cooled down, at least one of the two stacked liquid crystal panels, and preferably both liquid crystal panels, need to be cooled down.

The cooling device may include an air flow generator arranged to generate an air flow outside a display active area along the display active area defined by stacking the first and second liquid crystal panels.

The cooling device may also include a circulation device arranged to circulate a transparent fluid in a space formed between the stacked first and second liquid crystal panels.

The cooling device may also include a vent arranged to vent air from between the stacked first and second liquid crystal panels to outside.

The liquid crystal display may further include a lighting system for supplying display light to the stacked panels from behind the panels, wherein the cooling device includes a circulation device arranged to circulate a transparent fluid in a space formed between the stacked panels and the lighting system.

The liquid crystal display may further include a lighting system for supplying display light to the stacked panels from behind the panels, wherein the cooling device includes a vent arranged to vent air from a space formed between the stacked panels and the lighting system to outside.

The liquid crystal display may further include: a lighting system for supplying display light to the first and second liquid crystal panels; and lighting system cooling device arranged to cool the lighting system.

That enables use of high luminance lamps as the light source for the lighting system, thereby achieving improved luminance.

The lighting system may include: a light source; a reflection layer, disposed to surround the light source, for collecting light from the light source in a predetermined direction; and an optical member achieving a predetermined optical effect under the collected light, wherein the lighting system cooling device includes a forced air vent arranged to forcefully vent air from around the light source surrounded by the reflection layer and the optical member of the lighting system.

For example, the light source for the lighting system may include hot cathode fluorescence lamps.

Generally, hot cathode fluorescence lamps require lower application voltage than cold cathode fluorescent lamps, are easy to handle, and even if they are closely placed to each other, do not cause electrical withstand voltage problems. The hot cathode fluorescence lamp emits more light, hence discharges less heat due to good radiation efficiency, than the cold cathode fluorescent lamp. The hot cathode fluorescence lamps can therefore placed relatively close to each other, achieving very high density emission (high luminance) with a minimum temperature rise.

However, when the hot cathode fluorescence lamps are used at a high density as above, the amount of generated heat grows beyond an ignorable level. Heat transfers from the liquid crystal panels to a drive circuit, possibly leading to thermal runaway of the drive circuit.

A feasible way of cooling the drive circuit driving the first and second liquid crystal panels to prevent the problems described above is to provide a drive circuit cooling device.

Either one of the first and second liquid crystal panels may include a color filter.

The provision of a color filter in either one of the first liquid crystal panel and the liquid crystal panel producing a display from the second display signal as above prevents color mixture when the light having passed through one of the liquid crystal panels passes through the other liquid crystal panel. Accordingly, moire pattern occurrences attributable to color mixture are prevented.

Since only one of the liquid crystal panels includes a color filter, there is no need to provide a color filter in the other liquid crystal panel. As a result, only one color filter manufacturing step is needed in the manufacture of the liquid crystal display. That lowers manufacturing cost.

Preferably, the liquid crystal panel containing no color filter contains an active matrix substrate, and the opposite substrate facing the active matrix substrate has at least a black matrix formed thereon.

The arrangement reduces leak current induced by radiation of light to the TFT and other switching elements formed on the active matrix substrate.

The opposite substrate preferably has a light-transmitting resin layer in openings in the black matrix.

The light-transmitting resin layer planarizes the edges of the black matrix on the opposite substrate and makes alignment less likely to be disturbed at the edges of the black matrix. Display quality degradation attributable to alignment disturbance is reduced.

A mask used to form the color filter can be used to form the light-transmitting resin layer.

The light-transmitting resin layer is preferably formed to cover the black matrix and the openings in the black matrix.

Accordingly, the opposite substrate is planarized. Display quality degradation attributable to alignment disturbance is reliably reduced.

In this case, the light-transmitting resin layer is arranged to cover the black matrix and the openings in the black matrix. Patterning is not necessary. As a result, exposure and development steps which involve use of a mask can be omitted in forming the light-transmitting resin layer.

Preferably, the liquid crystal panel containing no color filter contains dots each having a size n×m times that of each dot in the liquid crystal panel containing the color filter, where n, m are real numbers, at least either one of n and m is greater than 1, n is a ratio taken parallel to gate bus lines, and m is a ratio taken parallel to source bus lines.

The arrangement reduces the number of source drivers of the liquid crystal panel containing no color filter to 1/n times that of the liquid crystal panel containing a color filter. Also, the arrangement reduces the number of gate drivers of the liquid crystal panel containing no color filter to 1/m times that of the liquid crystal panel containing a color filter. Accordingly, the cost of the liquid crystal display is greatly reduced.

The liquid crystal display may include a display controller arranged to supply display signals to the liquid crystal panels to control displays on the liquid crystal panels, wherein the display controller controls operation such that gray level data for one dot of the liquid crystal panel containing no color filter is maximum gray level data for n×m corresponding dots of the liquid crystal panel containing the color filter and also is gray level data represented by results of computing reflecting a maximum gray level, where n, m are real numbers, at least either one of n and m is greater than 1, n is a ratio taken parallel to gate bus lines, and m is a ratio taken parallel to source bus lines.

Preferably, the liquid crystal panel containing the color filter includes a matrix of pixels each being made up of a red dot, a green dot, and a blue dot; and the liquid crystal panel containing no color filter includes a matrix of pixels of a size that is an integral multiple of that of the pixels of the liquid crystal panel containing the color filter.

Accordingly, the liquid crystal panel containing no color filter includes far fewer source drivers and gate drivers than the liquid crystal panel containing a color filter.

The liquid crystal display according to various preferred embodiments of the present invention may be used as a display in a television receiver including: a tuner section for receiving television broadcast; and a display for displaying the television broadcast received by the tuner section.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 8:
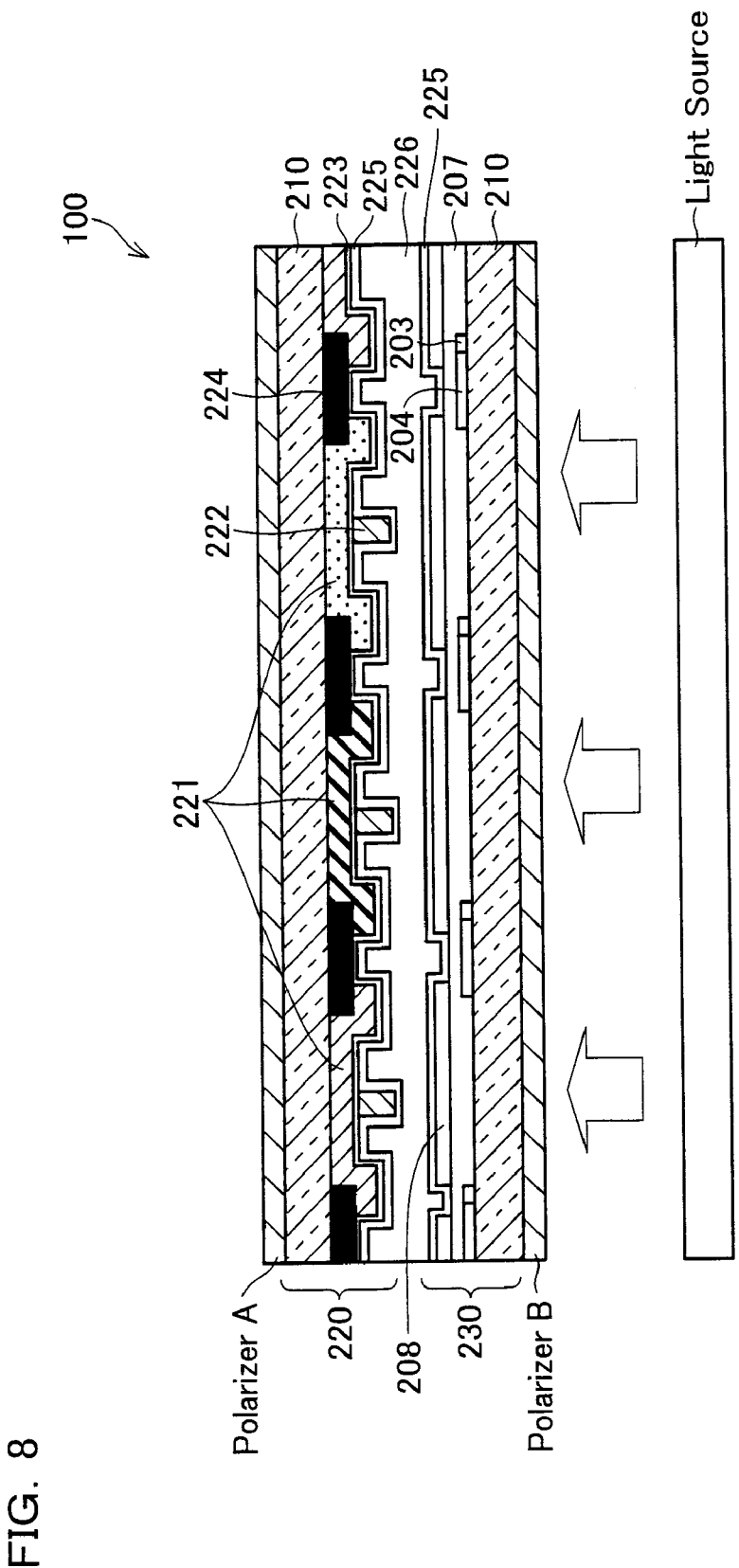
FIG. 8 is a schematic cross-sectional view of a liquid crystal display with a single liquid crystal panel.

Referring to FIG. 8, a typical liquid crystal display contains a liquid crystal panel and polarizers A, B attached to the panel. The panel includes a color filter substrate and a driver substrate. The description here will focus on the MVA (multi-domain vertical alignment) liquid crystal display.

Figure 9:
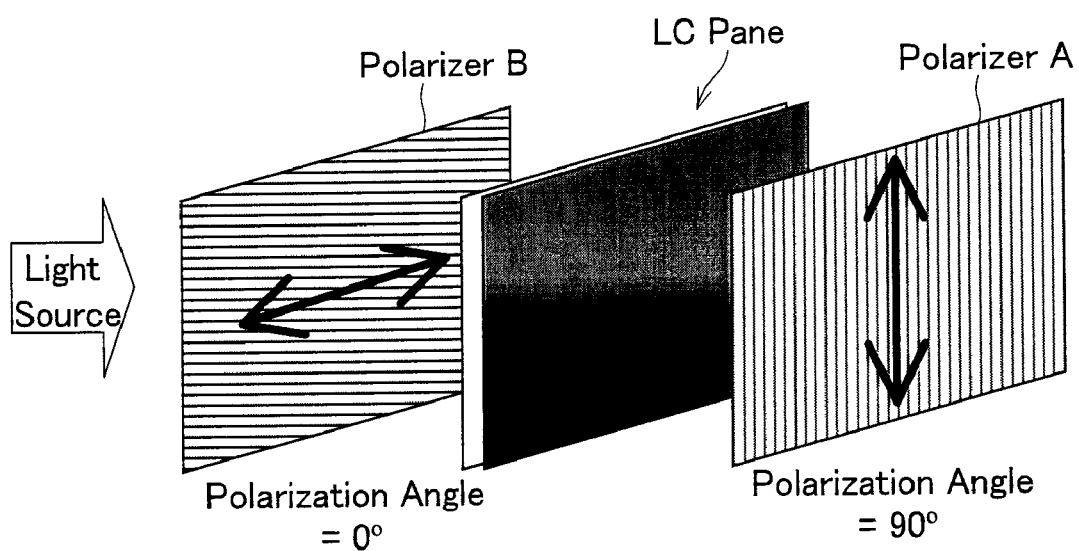
FIG. 9 illustrates the positional relationship of polarizers and panels in the liquid crystal display shown in FIG. 8.

The polarizers A, B, as shown in FIG. 9, are positioned so that their polarization axes (indicated by arrows in the figure) are substantially perpendicular to each other. The azimuth of the direction in which the liquid crystal aligns when a threshold voltage is applied to pixel electrodes 8 (FIG. 8) is set to 45° with respect to the polarization axes of the polarizers A, B. Under these conditions, the liquid crystal layer in the liquid crystal panel rotates the axis of incident light which has been polarized by the polarizer A; the light thus comes out of the polarizer B. When the voltage applied to the pixel electrodes is less than or equal to the threshold voltage, the liquid crystal aligns vertical to the substrate. The polarization angle of the incident light does not change, producing a black display. In MVA mode, the liquid crystal under applied voltage aligns in four directions (multi-domain) to deliver a large viewing angle.

Contrast improvement has a limit with the double polarizer structure shown in FIG. 8. The inventors of the present invention have found that three polarizers, arranged to define crossed Nicols, used in combination with two liquid crystal display panels, provide an improved shutter performance both in the front and oblique directions.

The following will discuss a contrast improvement mechanism.

Specifically, the inventors have made the following findings.

Front Direction

Light leaked in the direction of the transmission axis of crossed Nicols due to depolarization (scattering of CF, for example) in the panel. In the triple polarizer structure, the third polarizer is positioned so that its absorption axis matches with the light leaking in the direction of the transmission axis of the second polarizer. The leakage is thus eliminated.

Oblique Directions

Changes in leakage become less sensitive to an increasing Nicol angle φ of a polarizer, that is, black is less likely to lose its depth with an increasing Nicol angle φ at oblique viewing angles.

From these findings, the inventors have confirmed that the triple polarizer structure greatly improves the contrast of the liquid crystal display. The following will discuss a contrast improvement mechanism in reference to FIGS. 10A to 10C, FIGS. 11A to 11D, FIGS. 12A to 12C, FIG. 13A, FIG. 13B, FIGS. 14A to 14C, FIG. 15A, FIG. 15B, FIG. 16A, FIG. 16B, and Table 1. A double polarizer structure will be referred to as structure I, and a triple polarizer structure as structure II. The contrast improvements in oblique directions are attributable essentially to polarizer structure. The modeling here is based only on polarizers, involving no liquid crystal panel.

Figure 10A:
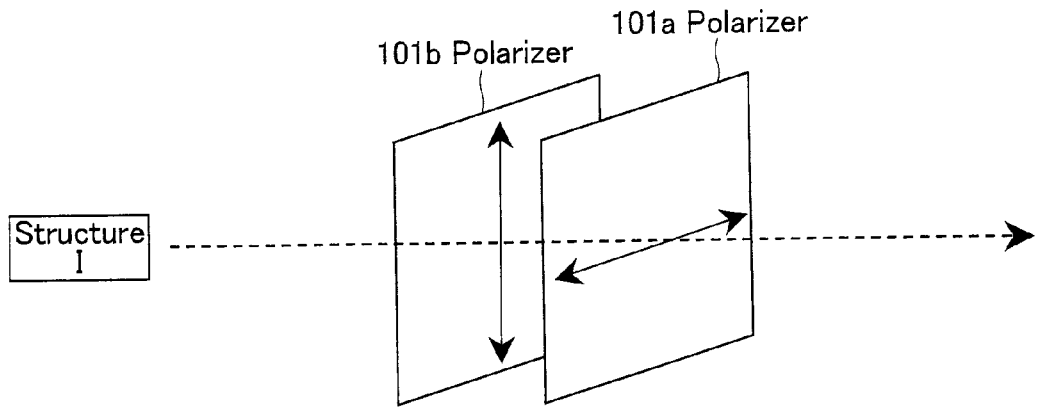
FIG. 10A illustrates a contrast improvement mechanism.
Figure 10B:
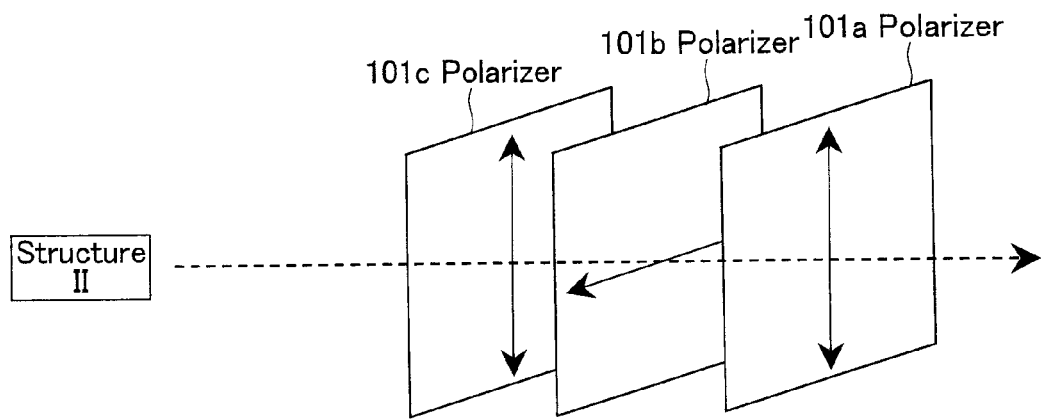
FIG. 10B illustrates a contrast improvement mechanism.
Figure 10C:
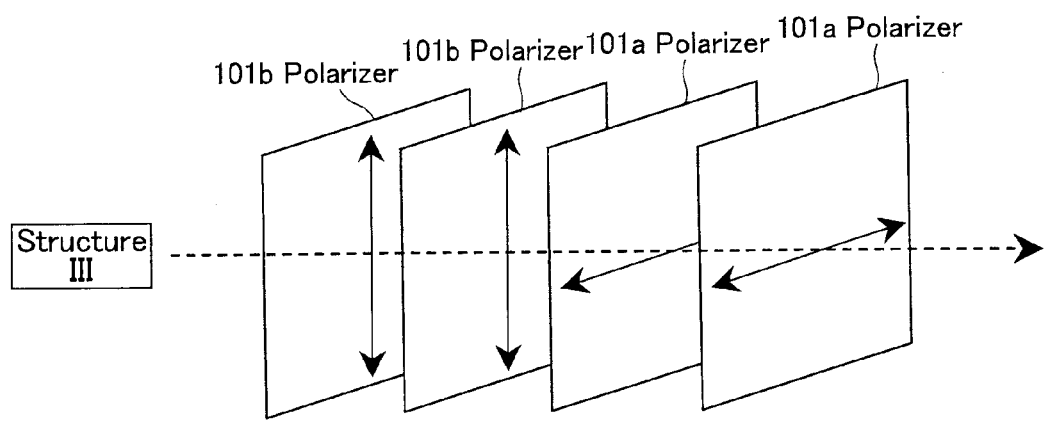
FIG. 10C illustrates a contrast improvement mechanism.

FIG. 10A depicts structure I with a single liquid crystal display panel, an example of two polarizers 101a, 101b disposed to form crossed Nicols. FIG. 10B depicts structure II, an example of three polarizers 101a, 101b, 101c disposed to form crossed Nicols. Since structure II includes two liquid crystal display panels, there are two pairs of polarizers which are arranged to define crossed Nicols. FIG. 10C depicts an example of a polarizer 101a and a polarizer 101b arranged face to face to define crossed Nicols; an additional polarizer of the same polarization direction is disposed outside each of the polarizers. Although FIG. 10C shows four polarizers, those polarizers which define crossed Nicols are only two of them that sandwich a liquid crystal display panel.

The transmittance at which the liquid crystal display panel produces a black display is modeled by treating that transmittance as the transmittance when polarizers are arranged to define crossed Nicols without a liquid crystal display panel, that is, a cross transmittance. The resultant transmittance model is referred to as a black display. Meanwhile, the transmittance at which the liquid crystal display panel produces a white display is modeled by treating that transmittance as the transmittance when polarizers are arranged to define parallel Nicols without a liquid crystal display panel, that is, a parallel transmittance. The resultant transmittance model is referred to as a white display. FIGS. 11A to 11D are graphs representing examples of the wavelength vs. transmittance relationship of a transmission spectrum when the polarizer is viewed from the front and at oblique angles. The modeled transmittances are ideal values of transmittances in white and black displays for polarizers arranged to define crossed Nicols which sandwiches the liquid crystal display panel.

Figure 11A:
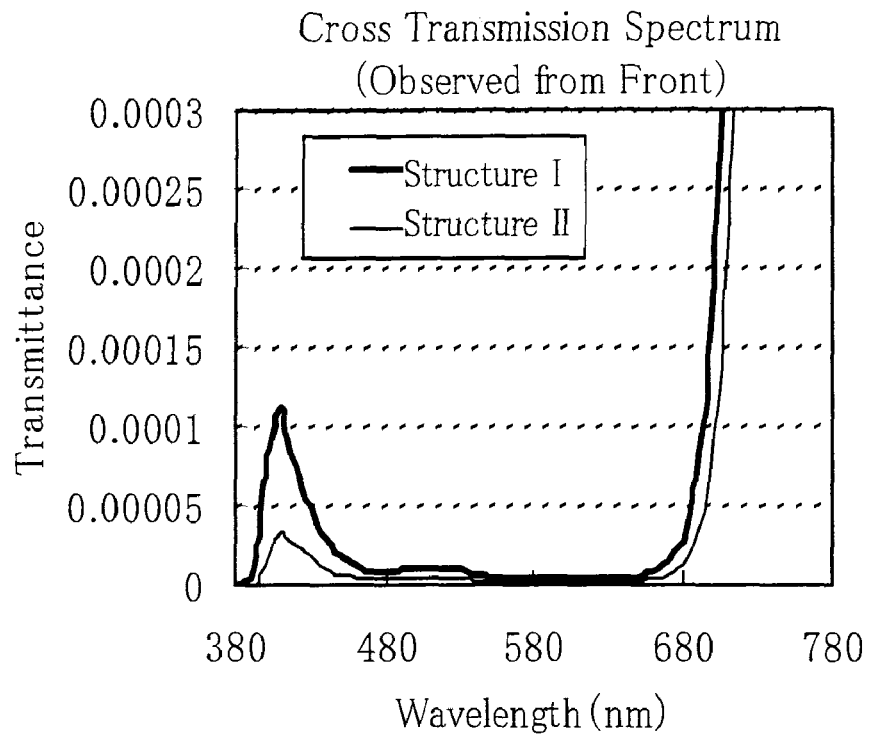
FIG. 11A illustrates a contrast improvement mechanism.

FIG. 11A is a graph showing the wavelength vs. cross transmittance relationship of a transmission spectrum for structures I, II for comparison when polarizers are viewed from the front. The graph demonstrates that structures I, II exhibit similar transmittance properties when a black display is viewed from the front.

Figure 11B:
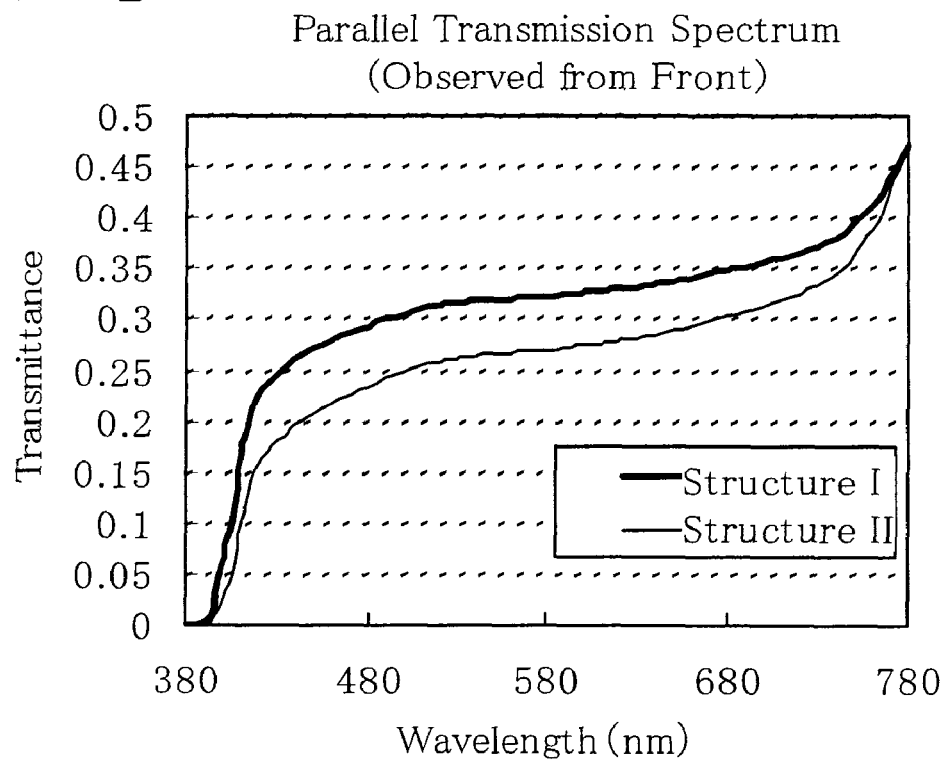
FIG. 11B illustrates a contrast improvement mechanism.

FIG. 11B is a graph showing the wavelength vs. parallel transmittance relationship of a transmission spectrum for structures I, II for comparison when polarizers are viewed from the front. The graph demonstrates that structures I, II exhibit similar transmittance properties when a white display is viewed from the front.

Figure 11C:
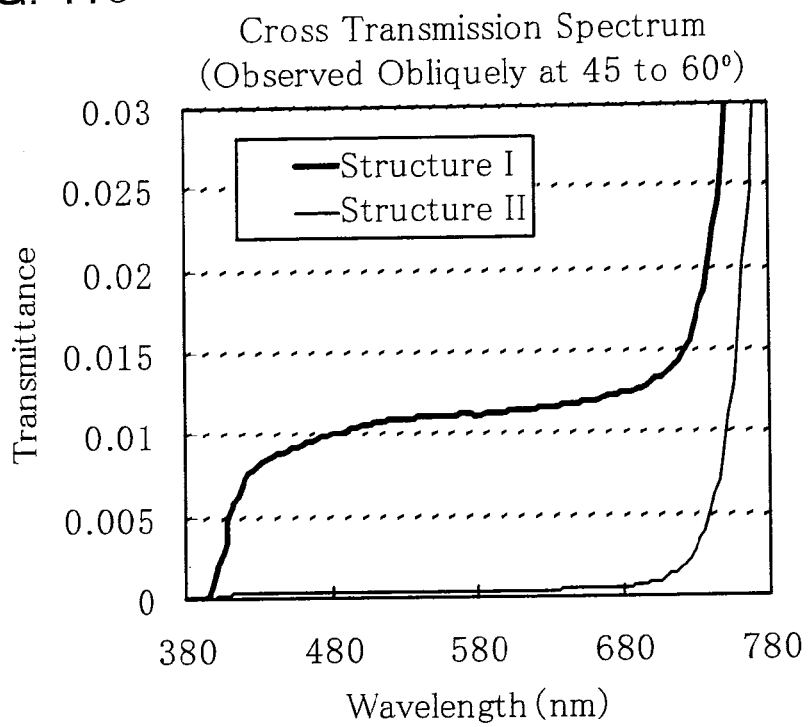
FIG. 11C illustrates a contrast improvement mechanism.

FIG. 11C is a graph showing the wavelength vs. cross transmittance relationship of a transmission spectrum for structures I, II for comparison when polarizers are viewed at oblique angles (azimuth=45°–polar angle 60°). The graph demonstrates that structure II exhibits an almost zero transmittance at many of the wavelengths shown, whilst structure I transmits a small amount of light at many of the wavelengths shown, when a black display is viewed at oblique angles. To put it differently, the double polarizer structure suffers light leakage (hence, loses crispness in blacks) when a black display is viewed at oblique viewing angles. On the other hand, the triple polarizer structure successfully prevents light leakage (hence, retains crispness in blacks) when a black display is viewed at oblique viewing angles.

Figure 11D:
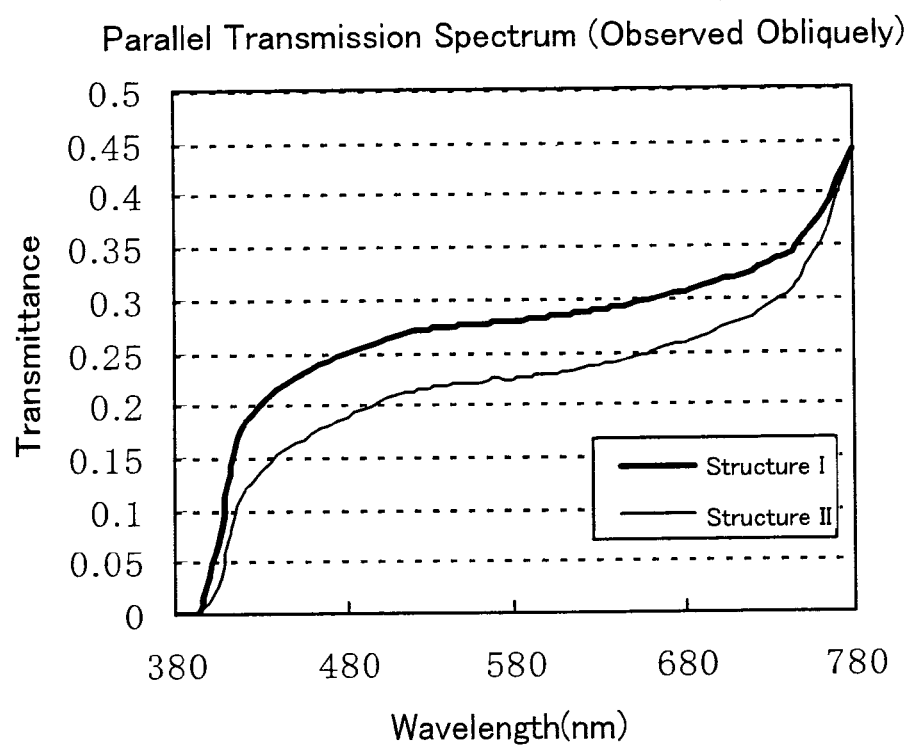
FIG. 11D illustrates a contrast improvement mechanism.

FIG. 11D is a graph showing the wavelength vs. parallel transmittance relationship of a transmission spectrum for structures I, II for comparison when polarizers are viewed at oblique angles (azimuth=45°–polar angle 60°). The graph demonstrates that structures I, II exhibit similar transmittance properties when a white display is viewed at oblique angles.

As shown in FIGS. 11B, 11D, white appears almost the same regardless of the number of polarizers used, in other words, the number of Nicol pairs provided by polarizers and also regardless of whether the display is viewed from the front or at oblique angles.

However, as shown in FIG. 11C, black appears less crisp on structure I (one Nicol pair) at oblique viewing angles, but remains crisp on structure II (two Nicol pairs) at oblique viewing angles.

Table 1 shows, as an example, the values of transmittance at 550 nm for the front and oblique angles (azimuth=45°–polar angle 60°).

TABLE 1

|  | Front | | | Oblique position (45° to 60°) | | |
| --- | --- | --- | --- | --- | --- | --- |
|  | Structure I | Structure II | II/I | Structure I | Structure II | II/I |
| Parallel | 0.319 | 0.265 | 0832 | 0.274499 | 0.219084 | 0.798 |
| Crossed | 0.000005 | 0.000002 | 0.4 | 0.01105 | 0.000398 | 0.0360 |
| Parallel/Crossed | 63782 | 132645 | 2.1 | 24.8 | 550.5 | 22.2 |

In Table 1, "Parallel" denotes parallel transmittance, or the transmittance in white display; "Cross" denotes cross transmittance, or the transmittance in black display; and "Parallel/Cross" therefore denotes contrast.

Table 1 demonstrates that the contrast for the front on structure II is about twice as high as that on structure I and also that the contrast for oblique angles on structure II is about 22 times as high as that on structure I. The contrast for oblique angles shows great improvements.

Now, referring to FIGS. 12A to 12C, viewing angle performance will be described for white display and black display. Assume in the description an azimuth of 45° with respect to polarizers and a wavelength of 550 nm.

Figure 12A:
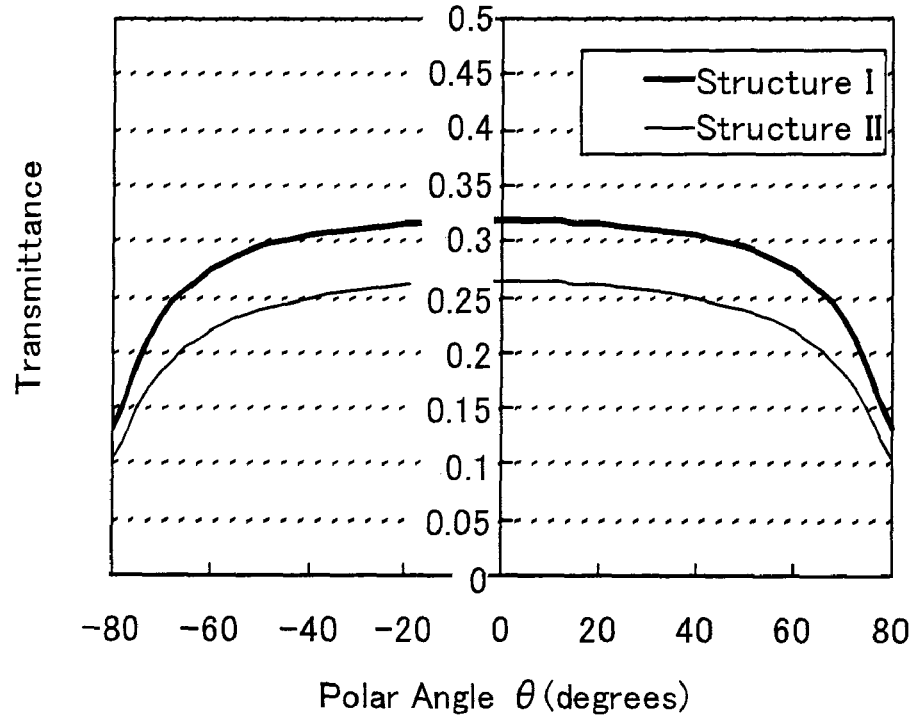
FIG. 12A illustrates a contrast improvement mechanism.

FIG. 12A is a graph representing the relationship between the polar angle and the transmittance in white display. The graph demonstrates that structures I and II share similar viewing angle performance (parallel viewing angle performance), albeit structure II exhibits a lower transmittance than structure I across the range.

Figure 12B:
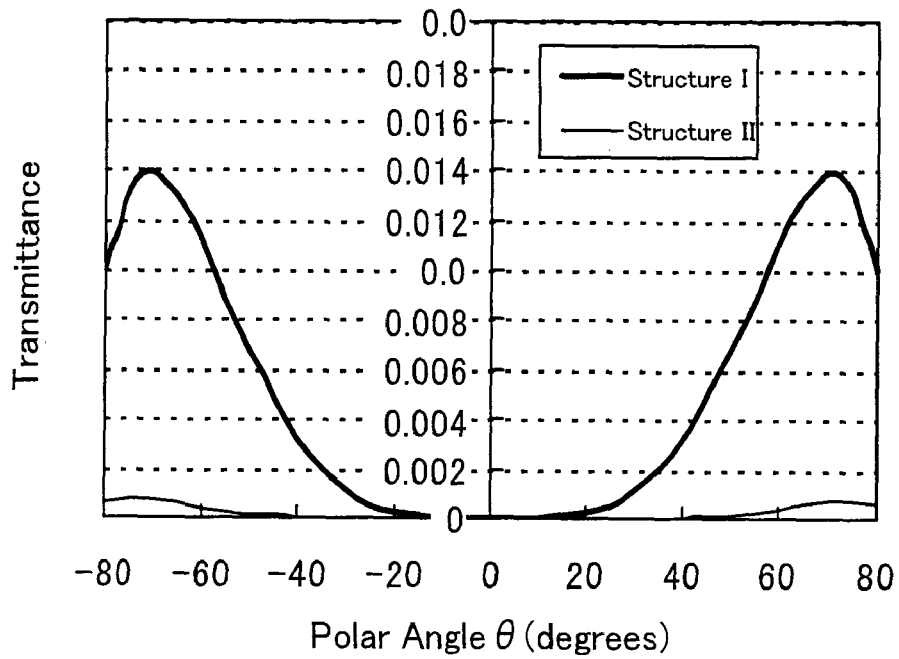
FIG. 12B illustrates a contrast improvement mechanism.

FIG. 12B is a graph representing the relationship between the polar angle and the transmittance in black display. The graph demonstrates that structure II well restrains the transmittance at oblique viewing angles (near polar angle ±80°). On the other hand, structure I exhibits an increased transmittance at oblique viewing angles. At oblique viewing angles, blacks appear markedly less crisp on structure I than on structure II.

Figure 12C:
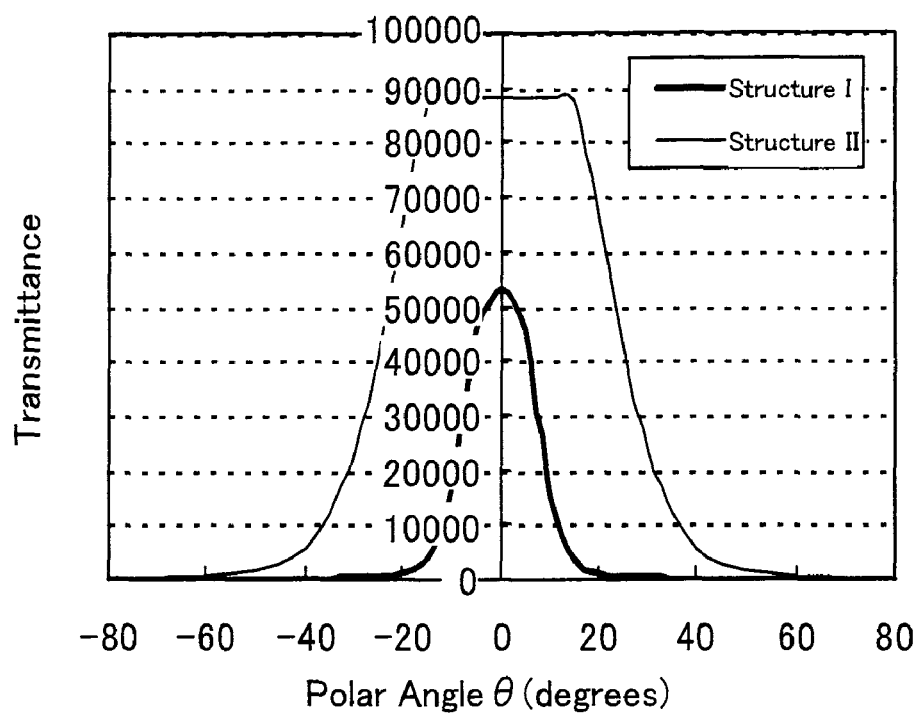
FIG. 12C illustrates a contrast improvement mechanism.

FIG. 12C is a graph representing the relationship between the polar angle and the contrast. The graph demonstrates that structure II exhibits far better contrast than structure I. The graph for structure II in FIG. 12C is "clipped off" near 0°. This particular portion of the graph is actually a smooth curve; it is clipped because the transmittance for black drops so sharply by orders of magnitude and renders calculation impractical.

Figure 13A:
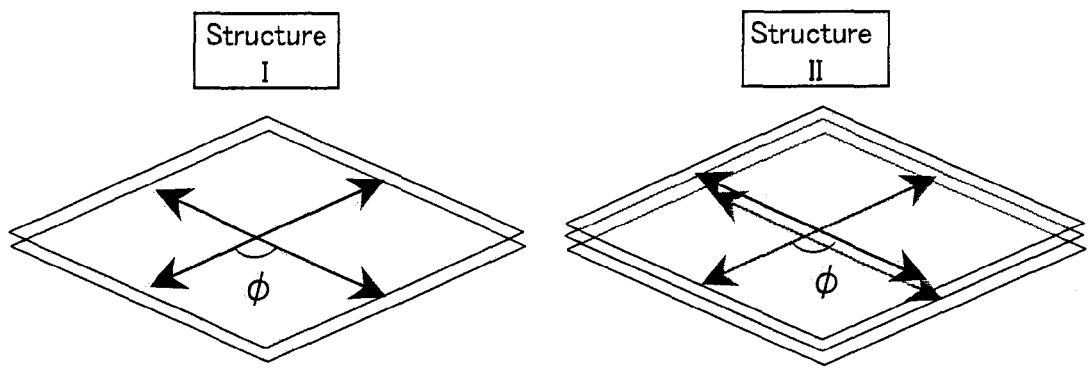
FIG. 13A illustrates a contrast improvement mechanism.

Next will be described the phenomenon that changes in leakage become less sensitive to an increasing Nicol angle φ of a polarizer, that is, black is less likely to lose its crispness with an increasing Nicol angle φ at oblique viewing angles, in reference to FIGS. 13A, 13B. The polarizer Nicol angle φ is an angle in a state that, as shown in FIG. 13A, the polarization axes of the oppositely positioned polarizers are skewed. FIG. 13A is a perspective view of polarizers which are positioned to define crossed Nicols; the figure shows the Nicol angle φ deviating from 90° (the deviation is the change in the Nicol angle).

Figure 13B:
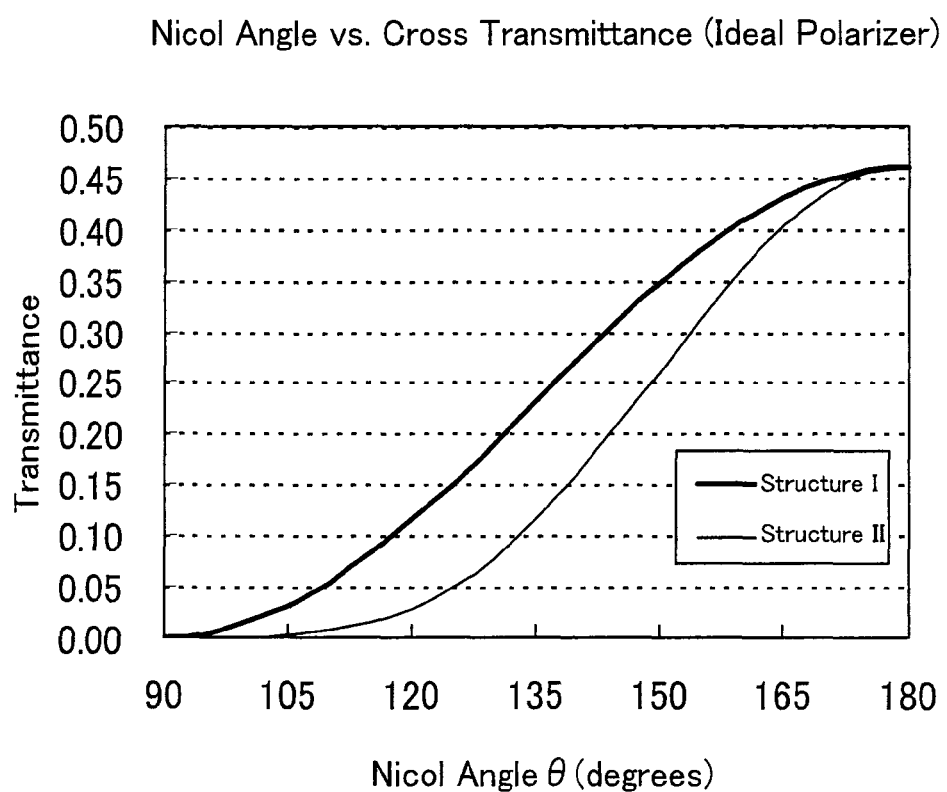
FIG. 13B illustrates a contrast improvement mechanism.

FIG. 13B is a graph representing the relationship between the Nicol angle φ and the cross transmittance. Calculations are carried out based on an ideal polarizer (parallel Nicol transmittance=50%; crossed Nicol transmittance=0%). The graph demonstrates that the transmittance changes less with a change in the Nicol angle φ in structure II than in structure I in producing black display. In other words, the triple polarizer structure is less affected by a change in the Nicol angle φ than the double polarizer structure.

Next, the thickness dependence of the polarizer will be described in reference to FIGS. 14A to 14C. The thickness of the polarizer is adjusted as in structure III in which, as shown in FIG. 10C, polarizers of the same polarization axis direction are added one by one on a pair of crossed Nicols polarizers. FIG. 10C shows an example of a pair of crossed Nicols polarizers 101a, 101b with another pair of polarizers 101a, 101b of the same polarization axis direction sandwiching the first pair. In this case, the structure includes a pair of crossed Nicols polarizers and two other polarizers; thus, "one crossed pair—2." Likewise, with each additional polarizer, "one crossed pair—3," "one crossed pair—4," . . . . To draw the graphs in FIGS. 14A to 14C, measurements are made on an assumption that azimuth=45° and polar angle=60°.

Figure 14A:
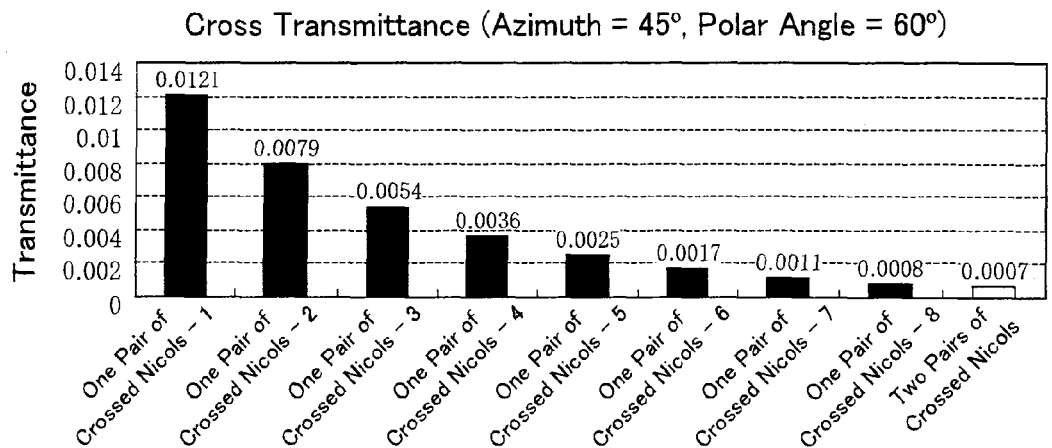
FIG. 14A illustrates a contrast improvement mechanism.

FIG. 14A is a graph representing the relationship between the thickness and the transmittance (cross transmittance) of a pair of crossed Nicols polarizers in producing black display. The graph also shows a transmittance for a structure with two pairs of crossed Nicols polarizers for comparison.

Figure 14B:
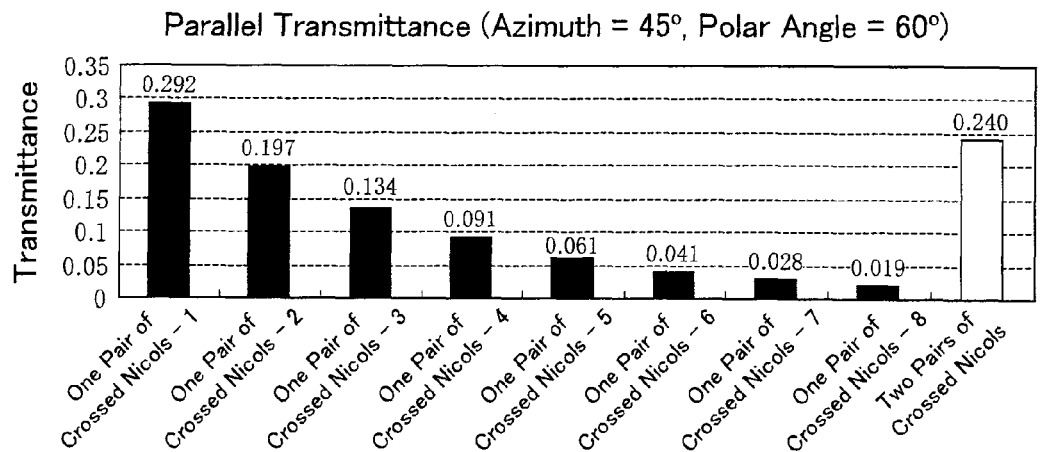
FIG. 14B illustrates a contrast improvement mechanism.

FIG. 14B is a graph representing the relationship between the thickness and the transmittance (parallel transmittance) of a pair of crossed Nicols polarizers in producing white display. The graph also shows a transmittance for a structure with two pairs of crossed Nicols polarizers for comparison.

The graph in FIG. 14A demonstrates that stacking polarizers reduces the transmittance in black display. Meanwhile, the graph in FIG. 14B demonstrates that stacking polarizers reduces the transmittance in white display. Simply stacking polarizers for the sake of prevention of reduced crispness in black display leads, undesirably, a decrease in the transmittance in white display.

Figure 14C:
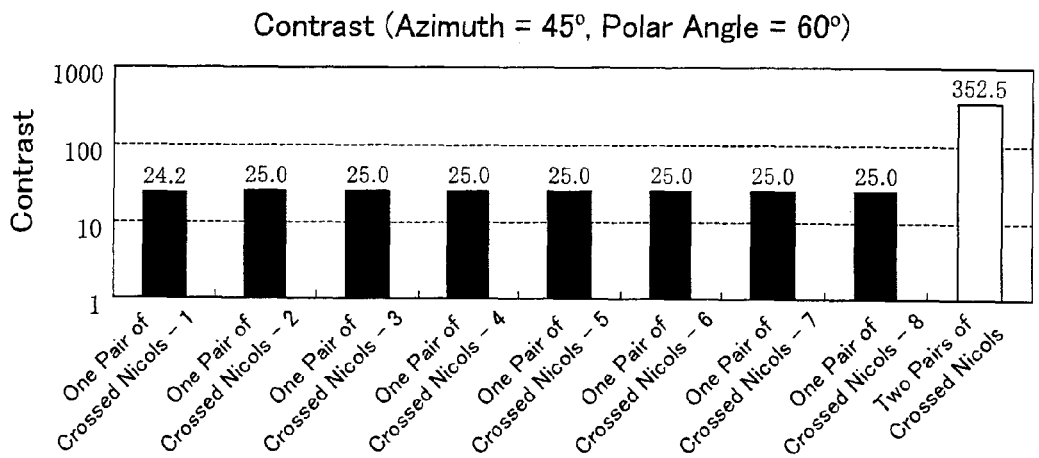
FIG. 14C illustrates a contrast improvement mechanism.

FIG. 14C is a graph representing the relationship between the thickness and the contrast of a pair of crossed Nicols polarizers. The graph also shows contrast for two pairs of crossed Nicols polarizers for comparison.

As discussed above, the graphs in FIGS. 14A to 14C demonstrate that the structure with two pairs of crossed Nicols polarizers prevents the loss of crisp blacks in black display and at the same time prevents reduced transmittance in white display. Besides, the two pairs of crossed Nicols polarizers include three polarizers; the pairs improve contrast by large amounts, as well as do not add to the total thickness of the liquid crystal display.

Figure 15A:
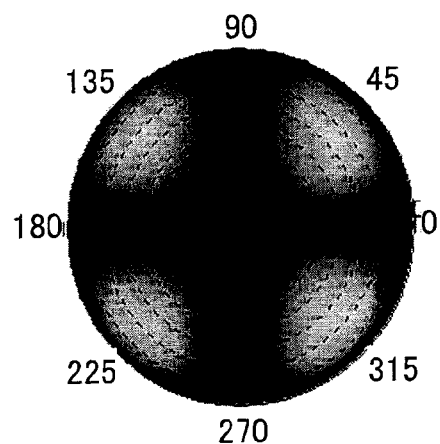
FIG. 15A illustrates a contrast improvement mechanism.
Figure 15B:
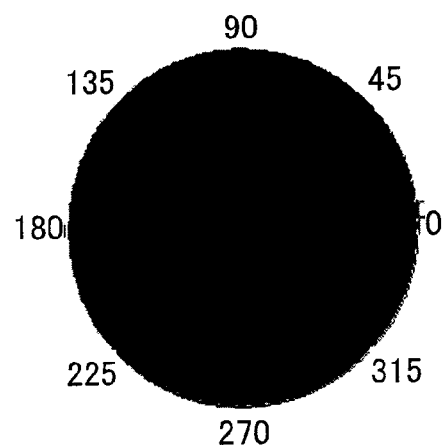
FIG. 15B illustrates a contrast improvement mechanism.

FIGS. 15A, 15B show viewing angle characteristics of crossed Nicol transmittance in a specific manner. FIG. 15A shows the viewing angle characteristics of crossed Nicols in structure I, i.e., a double polarizer structure with a pair of crossed Nicols. FIG. 15B shows the viewing angle characteristics of crossed Nicols in structure II, i.e., a triple polarizer structure with two pairs of crossed Nicols.

The diagrams in FIGS. 15A, 15B demonstrate that the structure with two pairs of crossed Nicols is almost free from degrading crispness in blacks (attributable to little increase in the transmittance in black display). This advantage of the structure is evident at 45°, 135°, 225°, and 315°.

Figure 16A:
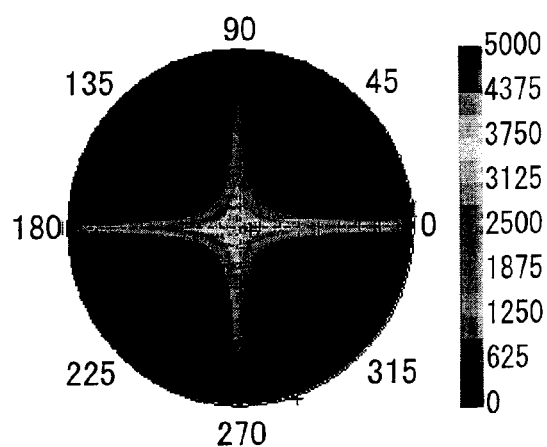
FIG. 16A illustrates a contrast improvement mechanism.
Figure 16B:
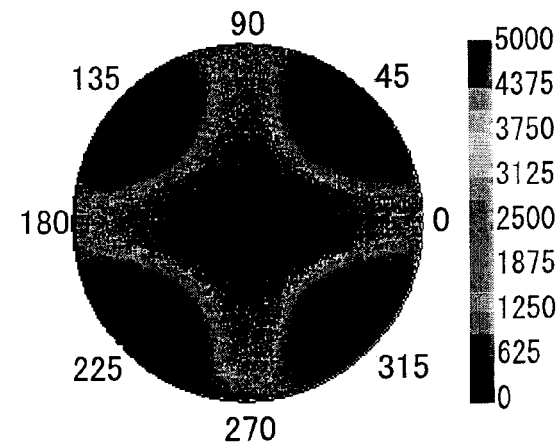
FIG. 16B illustrates a contrast improvement mechanism.

FIGS. 16A, 16B show viewing angle characteristics of contrast (parallel/cross luminance) in a specific manner. FIG. 16A shows the viewing angle characteristics of contrast in structure I, i.e., a double polarizer structure with a pair of crossed Nicols. FIG. 16B shows the viewing angle characteristics of contrast in structure II, i.e., a triple polarizer structure with two pairs of crossed Nicols.

The diagrams in FIGS. 16A, 16B demonstrate that the structure with two pairs of crossed Nicols exhibits improved contrast than the structure with a pair of crossed Nicols.

Now, referring to FIGS. 1 to 9, the following will describe this contrast improvement mechanism being applied to the liquid crystal display.

Figure 1:
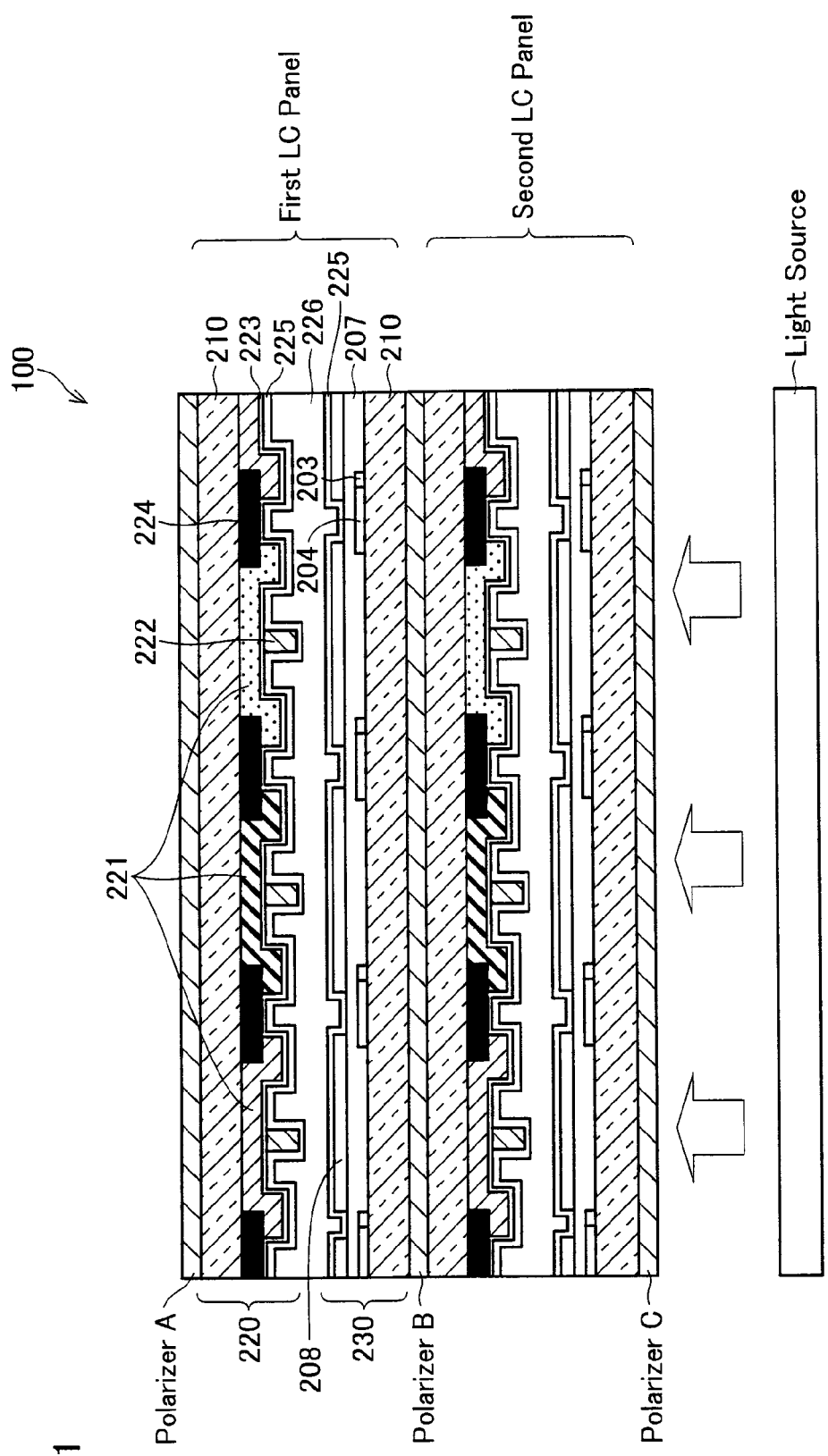
FIG. 1 is a schematic cross-sectional view of a liquid crystal display, illustrating a preferred embodiment of the present invention.

FIG. 1 is a schematic cross-section of a liquid crystal display 100 in accordance with the present preferred embodiment.

The liquid crystal display 100 includes panels and polarizers being stacked alternately on top of each other as shown in FIG. 1. The two panels are referred to as a first liquid crystal panel and a second liquid crystal panel. The three polarizers are denoted by A, B, and C.

Figure 2:
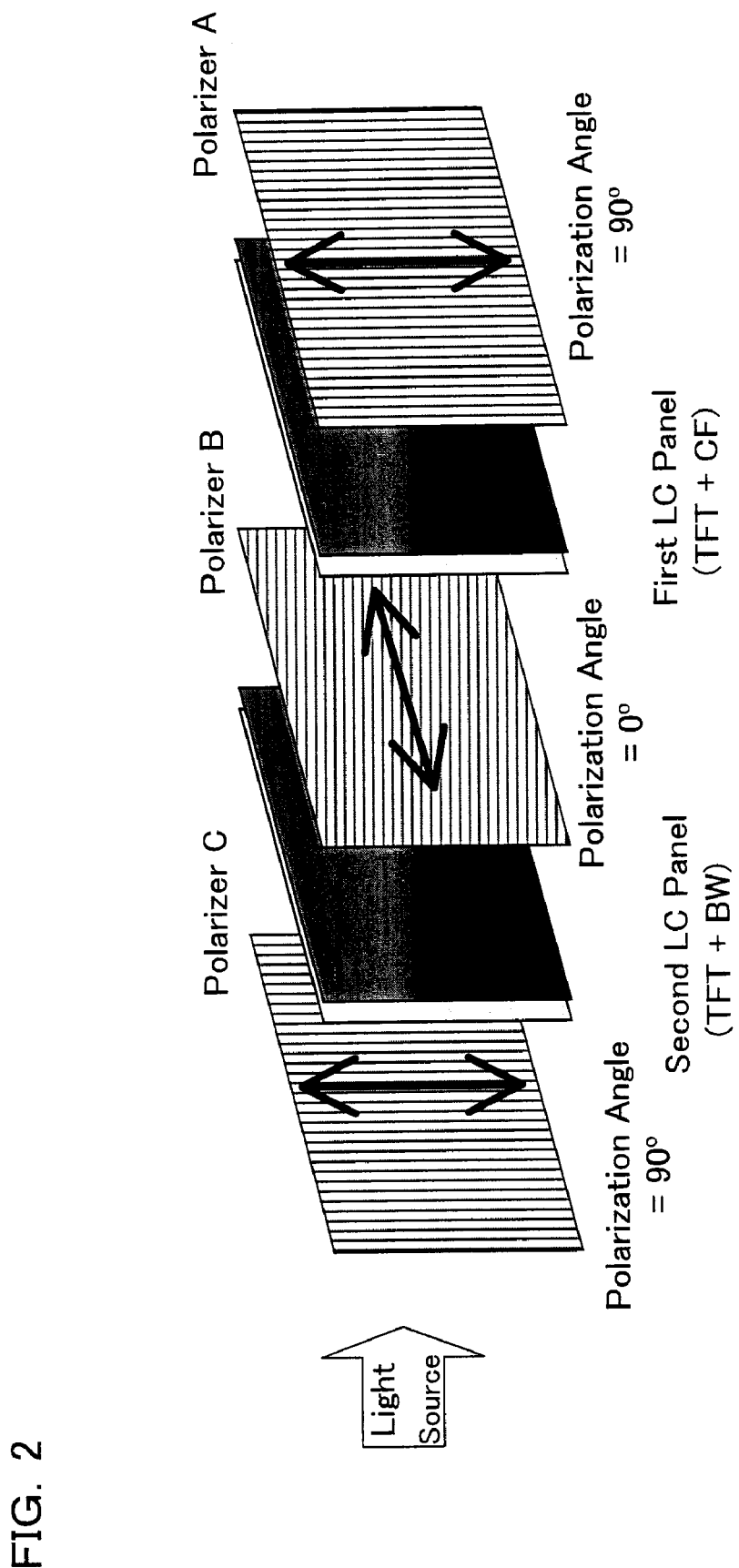
FIG. 2 illustrates the positional relationship of polarizers and panels in the liquid crystal display shown in FIG. 1.

FIG. 2 is an illustration of the joining of the polarizers and the liquid crystal panels in the liquid crystal display 100 shown in FIG. 1. In FIG. 2, the polarizers A, B, C are positioned so that the polarization axis of the polarizer B is perpendicular or substantially perpendicular to those of the polarizers A, C. The polarizers A and B define a pair of crossed Nicols, and the polarizers B and C define another pair.

Each of the first and second liquid crystal panels is a pair of transparent substrates (a color filter substrate 20 and an active matrix substrate 30) with liquid crystal being sealed in between. Each panel has a switch arranged to switch between a state in which the polarized light incident to the polarizer A from the light source is rotated by about 90°, a state in which the polarized light is not rotated, and any intermediate states as desired, by electrically changing the alignment of the liquid crystal.

Each of the first and second liquid crystal panels includes a color filter 21 and is capable of producing an image using a plurality of pixels. This display function is achieved by various display modes: TN (twisted nematic) mode, VA (vertical alignment) mode, IPS (in-plain switching) mode, FFS (fringe field switching) mode, and combinations of these modes. Among these modes, VA is suitable because this mode exhibits high contrast without combining with any other modes. Although the description here will focus on MVA (multi-domain vertical alignment) mode, IPS and FFS modes are also sufficiently effective with the present invention because both operate in normally black mode. The liquid crystal preferably is driven by active matrix driving using TFTs (thin film transistors). For a detailed description of MVA manufacturing methods, see Japanese Unexamined Patent Publication 2001-83523 (Tokukaihei 2001-83523), for example.

The first and second liquid crystal panels in the liquid crystal display 100 preferably have the same structure. Each panel includes a color filter substrate 20 and an active matrix substrate 30 positioned face to face as mentioned above and also include spacers (not shown) to maintain the substrates at a specific distance from each other. The spacers are, for example, plastic beads or resin columns provided on the color filter substrate 20. Liquid crystal is sealed between the two substrates (the color filter substrate 20 and the active matrix substrate 30). A vertical alignment film 25 is provided on the surface of each substrate which comes in contact with the liquid crystal. The liquid crystal preferably is nematic liquid crystal with negative dielectric anisotropy.

The color filter substrate 20 includes a transparent substrate 10 with a color filter 21, a black matrix 24, and other components built on the substrate 10.

Figure 3:
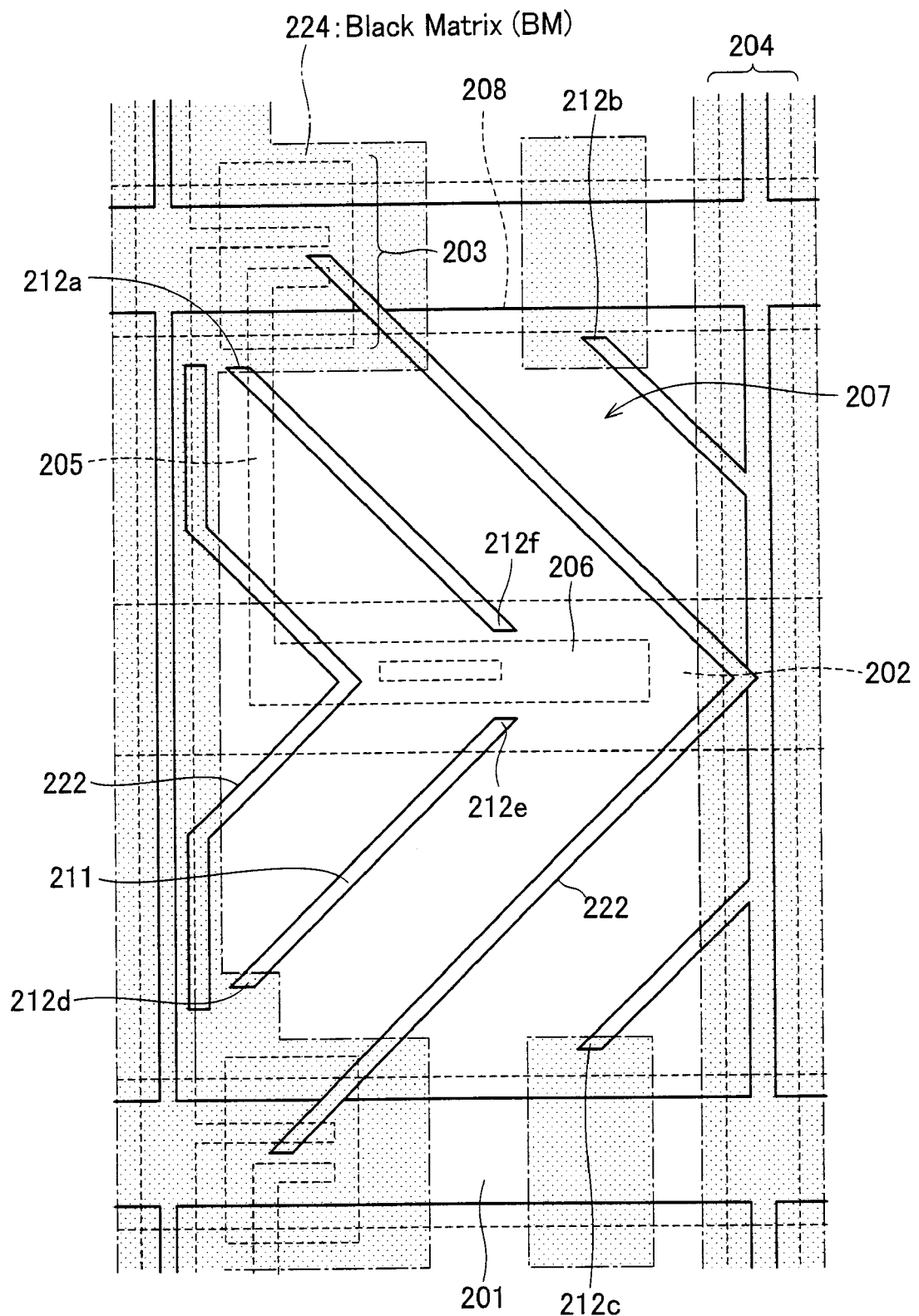
FIG. 3 is a plan view of a pixel electrode and its surrounding area in the liquid crystal display shown in FIG. 1.

The active matrix substrate 30 includes, as shown in FIG. 3, a transparent substrate 10 with TFT elements 3, pixel electrodes 8, and other components built on the substrate 10. The substrate 30 is provided also with alignment controlling projections 22 and a slit pattern 11 which control the alignment direction of the liquid crystal. As a threshold or higher voltage is applied to the pixel electrodes 8, liquid crystal molecules fall perpendicular to the projections 22 (FIG. 2) and the slit pattern 11. In the present preferred embodiment, the projections 22 and the slit pattern 11 are arranged so that liquid crystal molecules align at an azimuth of 45° with respect to the polarization axis of the polarizer.

As described in the foregoing, the first and second liquid crystal panels are constructed so that the red (R), green (G), and blue (B) dots of one of the color filters 21 are positioned to match those of the other color filter 21 when viewed normal to the panels. Specifically, the R dots of the first panel are positioned to match those of the second panel; the G dots of the first panel are positioned to match those of the second panel; and the B dots of the first panel are positioned to match those of the second panel, when viewed normal to the panels.

Figure 4:
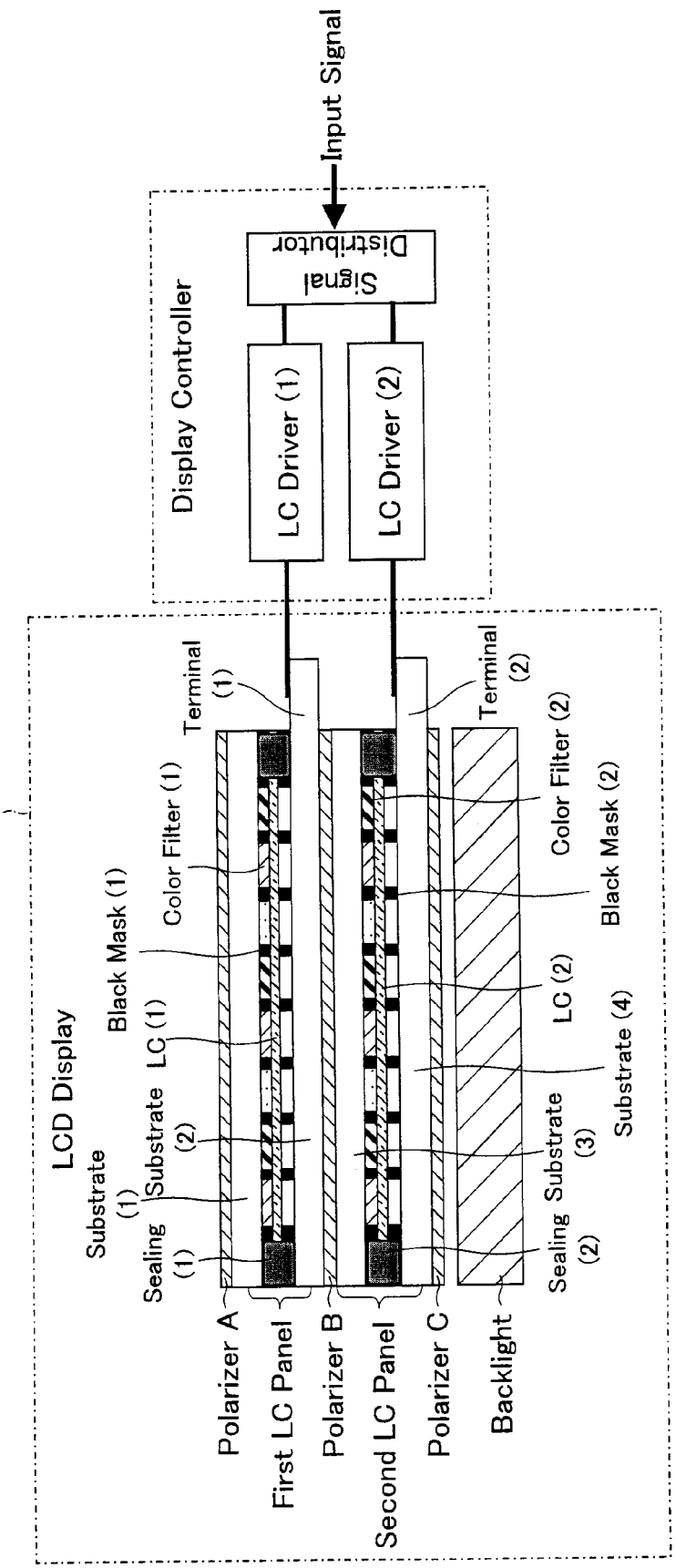
FIG. 4 is a schematic structural diagram of a drive system which drives the liquid crystal display shown in FIG. 1.

FIG. 4 is a schematic of a drive system for the liquid crystal display 100 constructed as above.

The drive system contains a display controller required to display video on the liquid crystal display 100.

The display controller includes a first and a second liquid crystal drive section (1), (2) which drive the first and the second liquid crystal panel respectively with predetermined signals. The display controller also includes a signal distribution section which distributes video source signals to the first and second liquid crystal drive sections (1), (2).

Therefore, the display controller is adapted to send signals to the panels in such a manner that the liquid crystal display 100 can display suitable images.

The display controller sends suitable electric signals to the panels according to incoming video signals and includes drivers, circuit boards, panel drive circuits, and other components.

Figure 5:
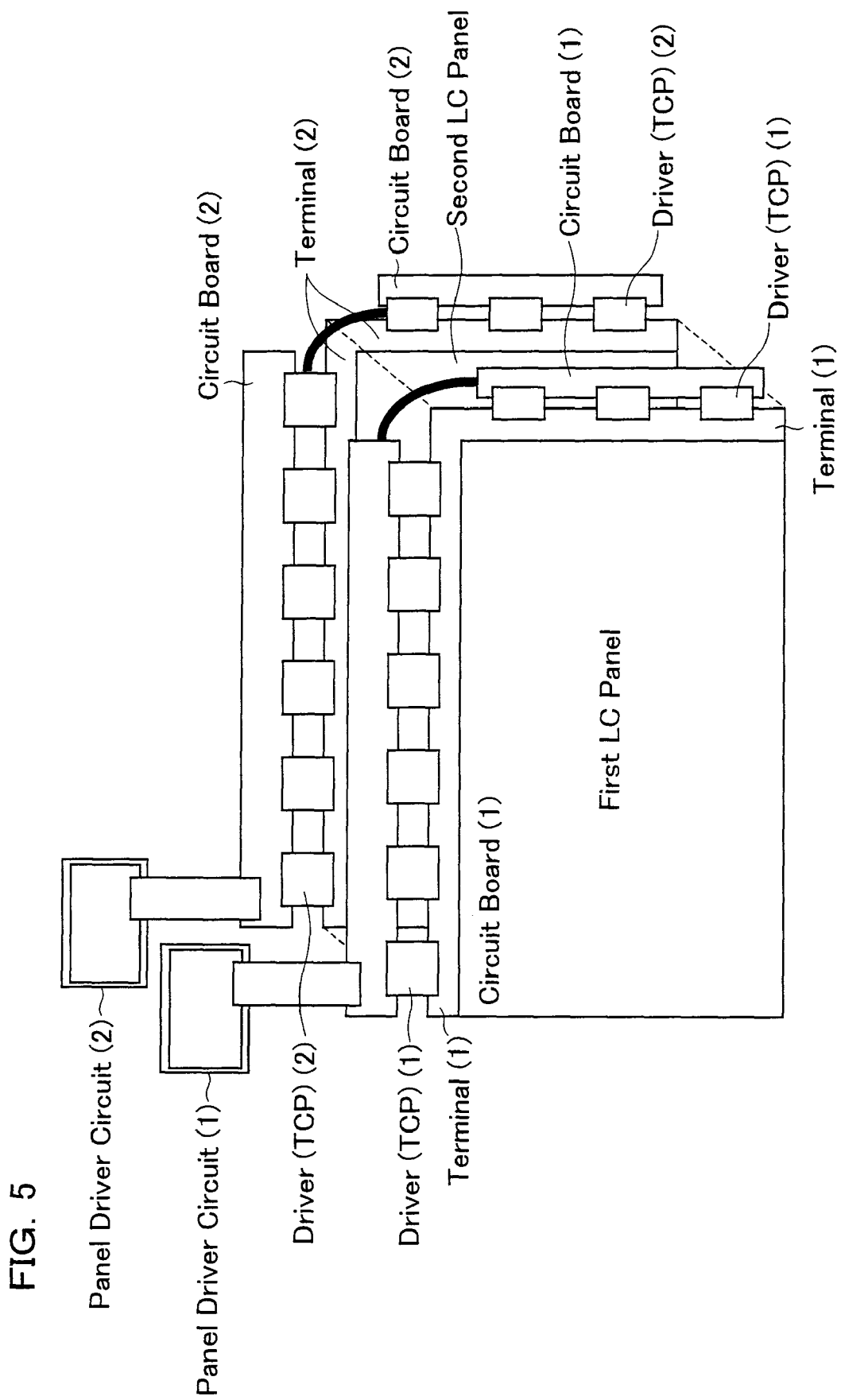
FIG. 5 illustrates connections between drivers and panel drive circuits in the liquid crystal display shown in FIG. 1.

FIG. 5 illustrates connections between the first and second liquid crystal panels and the respective liquid crystal panel drive circuits. The polarizers are omitted in FIG. 5.

The first liquid crystal drive section (1) is connected via a driver (TCP) (1) to terminals (1) provided on the circuit board (1) of the first liquid crystal panel. In other words, the driver (TCP) (1) is connected to the first liquid crystal panel, coupled by the circuit board (1), and connected to the liquid crystal drive section (1).

The second liquid crystal drive section (2) is connected to the second liquid crystal panel in the same manner as the first liquid crystal drive section (1) is to the first liquid crystal panel; no further description is given.

Next will be described an operation of the liquid crystal display 100 constructed as above.

The pixels in the first liquid crystal panel are driven according to display signals. The corresponding pixels in the second liquid crystal panel (those which appear overlapping the pixels in the first liquid crystal panel when viewed normal to the panels) are driven in association with the first liquid crystal panel. When the combination of the polarizer A, the first liquid crystal panel, and the polarizer B (construction 1) transmits light, so does the combination of the polarizer B, the second liquid crystal panel, and the polarizer C (construction 2); when construction 1 does not transmit light, nor does the construction 2.

The first and second liquid crystal panels may be fed with identical image signals or associated, but different signals.

Next will be described a manufacturing method for the active matrix substrate 30 and the color filter substrate 20.

A manufacturing method for the active matrix substrate 30 will be first described.

Metal films (e.g. Ti/Al/Ti) are stacked by sputtering on a transparent substrate 10 to form scan signal lines (gate wires or gate bus lines) 1 and auxiliary capacitance lines 2 as shown in FIG. 3. A resist pattern is formed on the films by photolithography and dry etched in an etching gas (e.g. chlorine-based gas) to remove the resist. That simultaneously forms the scan signal lines 1 and the auxiliary capacitance lines 2 on the transparent substrate 10.

Thereafter, a gate insulating film is formed of a silicon nitride (SiNx) and other materials, an active semiconductor layer is formed of amorphous silicon and other materials, and a low resistance semiconductor layer is formed of amorphous silicon and other materials doped with, for example, phosphor, all by CVD. Then, metal films (e.g. Al/Ti) are stacked by sputtering to form data signal lines (source wires or source bus lines) 4, drain lead-out lines 5, and auxiliary capacitance forming electrodes 6. A resist pattern is formed on the films by photolithography and dry etched in an etching gas (e.g., chlorine-based gas) to remove the resist. That simultaneously forms the data signal lines 4, the drain lead-out lines 5, and the auxiliary capacitance forming electrodes 6.

An auxiliary capacitance is formed between auxiliary capacitance lines 2 and auxiliary capacitance forming electrodes 6 with an intervening gate insulating film about 4000 angstroms thick, for example.

Thereafter, the low resistance semiconductor layer is dry etched, for example, in a chlorine gas to form TFT elements 3 and thus separate the sources from the drains.

Next, an interlayer insulating film 7 of, for example, an acrylic-based photosensitive resin is formed by spin coating. Contact holes 9 which electrically connect the drain lead-out lines 5 to pixel electrodes 8 are formed by photolithography. The interlayer insulating film 7 is about 3-μm thick.

Furthermore, pixel electrodes 8 and a vertical alignment film (not shown) are formed in this order to complete the manufacture.

The present preferred embodiment preferably is an MVA liquid crystal display as mentioned earlier and has a slit pattern 11 in the pixel electrodes 8 made of ITO and other materials. Specifically, a film is formed by sputtering, followed by a resist pattern being formed by photolithography. Then, etching is carried out in an etching solution, e.g., iron (III) chloride, to form pixel electrode patterns as shown in FIG. 3.

This concludes the manufacturing process of the active matrix substrate 30.

The reference numerals 12a, 12b, 12c, 12d, 12e, 12f in FIG. 3 represent electrical connection sections of the slit in the pixel electrode 8. In the electrical connection sections of the slit, alignment is disturbed, resulting in alignment anomaly. Besides, a positive voltage is applied to the gate wire (slits 12a to 12d) to turn on the TFT element 3 generally for periods on the order of microseconds, whereas a negative voltage is applied to turn off the TFT element 3 generally for periods on the order of milliseconds; a negative voltage is applied for most of the time. Thus, if the slits 12a to 12d are disposed on the gate wires, ionic impurities contained in the liquid crystal may concentrate due to a gate negative DC application component. The alignment anomaly and ionic impurity concentration may cause the slits 12a to 12d to be spotted as display non-uniformities. The slits 12a to 12d therefore need to be disposed where they do not overlap the gate wires. The slits 12a to 12d are better hidden with the black matrix 24 as shown in FIG. 3.

Next will be described a manufacturing method for the color filter substrate 20.

The color filter substrate 20 includes a color filter layer, an opposite electrode 23, a vertical alignment film 25, and alignment controlling projections 22 on the transparent substrate 10. The color filter layer includes the color filters (three primary colors [red, green, and blue]) 21 and the black matrix (BM) 24.

First, a negative, acrylic-based photosensitive resin solution containing dispersed fine carbon particles is applied onto the transparent substrate 10 by spin coating and dried to form a black photosensitive resin layer. Subsequently, the black photosensitive resin layer is exposed to light using a photomask and developed to form the black matrix (BM) 24. The BM is formed so as to have respective openings for a first color layer (e.g., red layer), a second color layer (e.g., green layer), and a third color layer (e.g., blue layer) in areas where the first, second, and third color layers will be provided (the openings are provided corresponding to the pixel electrodes). More specifically, referring to FIG. 3, a BM pattern is formed like an island, and a light blocking section (BM) is formed on the TFT elements 3. The BM pattern shields from light anomalous alignment regions which occur in the slits 12a to 12d of electrical connection sections in the slit 12a to 12f in the pixel electrodes 8. The light blocking section prevents increases in leak current induced by external light hitting the TFT elements 3.

After applying a negative, acrylic-based photosensitive resin solution containing a dispersed pigment by spin coating, the solution is dried, exposed to light using a photomask, and developed to form a red layer.

The same steps are repeated to form the second color layer (e.g., green layer) and the third color layer (e.g., blue layer). That completes the manufacturing process of the color filter 21.

Furthermore, the opposite electrode 23 is formed of a transparent electrode, such as ITO, by sputtering. A positive, phenolnovolak-based photosensitive resin solution is then applied by spin coating. The solution is dried, exposed to light using a photomask, and developed to form the vertical alignment controlling projections 22.

This completes the manufacture of the color filter substrate 20.

The present preferred embodiment preferably uses a BM made of resin. The BM may be made of a metal. The three primary colors of the color layers may not be red, green, and blue; they may be cyan, magenta, and yellow as an example, and there also may be provided a white layer.

Now, the color filter substrate 20 and the active matrix substrate 30 manufactured as described above are joined to form a liquid crystal panel (first and second liquid crystal panels) by the following method.

First, a vertical alignment film 25 is formed on the surfaces of the color filter substrate 20 and the active matrix substrate 30 which come in contact with the liquid crystal. Specifically, before the formation of the alignment film, the substrate is baked for degassing and washed. The alignment film is then baked. After that, the substrate is washed and baked for degassing. The vertical alignment films 25 establish the alignment direction of the liquid crystal 26.

Next will be described a method for sealing the liquid crystal between the active matrix substrate 30 and the color filter substrate 20.

One of available liquid crystal sealing methods is vacuum injection, which is described here briefly. A thermosetting sealing resin is disposed around the substrate with an injection hole being left open for the injection of liquid crystal. The injection hole is immersed in liquid crystal in vacuum to drive out air from the closed space so that the liquid crystal can move in instead. Finally, the injection hole is sealed using, for example, a UV-setting resin. The vacuum injection however is undesirably time-consuming for the manufacture of a liquid crystal panel for vertical alignment mode, compared to the manufacture of a horizontal alignment panel. Drop-wise liquid crystal dispensing/joining is preferably used here.

A UV-setting sealing resin is applied to the periphery of the active matrix substrate while liquid crystal is dispensed drop-wise onto the color filter substrate. An optimal amount of liquid crystal is dispensed drop-wise regularly inside the sealing so that the liquid crystal establishes a desired cell gap.

The pressure inside the joining device is reduced to 1 Pa to join the color filter substrate which has the sealing resin disposed thereon and the active matrix substrate which has the liquid crystal dispensed drop-wise thereon. After the substrates are joined to each other at the low pressure, the pressure is changed back to the atmospheric pressure to collapse the sealing, leaving a desired gap in the sealing section.

The resultant structure with a desired cell gap in the sealing section is irradiated with UV radiation in a UV projection device for preliminary setting of the sealing resin. The structure is then baked in order to completely set the sealing resin. At this stage, the liquid crystal moves into every corner inside the sealing resin, filling up the cell. After the baking, the structure is separated into individual liquid crystal panels. That completes the manufacture of the liquid crystal panel.

In the present preferred embodiment, the first and second liquid crystal panels preferably are manufactured by the same process.

Next will be described the mounting of components to the first and second liquid crystal panels manufactured as above.

Here, the first and second liquid crystal panels are washed, and polarizers are attached to the panels. Specifically, polarizers A and B are attached respectively to the front and the back of the first panel as shown in FIG. 4. A polarizer C is attached to the back of the second liquid crystal panel. The polarizers may be stacked together with other layers, such as optical compensation sheets, where necessary.

Then drivers (liquid crystal driver LSI) are connected. Here, the drivers are connected using TCPs (tape career packages).

For example, an ACF (anisotropic conductive film) is attached to the terminals (1) of the first liquid crystal panel by preliminary compression as shown in FIG. 5. The TCPs (1) carrying the drivers are punched out of the carrier tape, aligned with panel terminal electrodes, and heated for complete compression/attachment. Thereafter, the input terminals (1) of the TCPs (1) are connected to the circuit board (1) using an ACF. The circuit board (1) is provided to couple the driver TCPs (1) together.

Next, two liquid crystal panels are joined. The polarizer B has an adhesive layer on each side. The surface of the second liquid crystal panel is washed, and the laminates of the adhesive layers of the polarizer B on the first liquid crystal panel are peeled off. The first and second liquid crystal panels, after being precisely aligned, are joined. Bubbles may be trapped between the panel and the adhesive layer during the joining process; it is therefore desirable to join the panels in vacuum.

Alternatively, the panels may be joined by another method as follows. An adhesive agent which sets at normal temperature or at a temperature not exceeding the panel's thermal resistance temperature (e.g., epoxy adhesive agent) is applied to the periphery of the panels. Plastic spacers are scattered, and, for example, fluorine oil is sealed. Preferred materials are optically isotropic liquids with a refractive index close to that of a glass substrate and as stable as liquid crystal. The present preferred embodiment is applicable to cases where the terminal surface of the first liquid crystal panel and that of the second liquid crystal panel are at the same position as illustrated in FIGS. 4 and 5. The terminals may be disposed in any direction with respect to the panel and attached to the panel by any method. For example, they may be fixed mechanically without using adhesive.

After joining the two panels, a lighting system called a backlight is attached to complete the manufacture of the liquid crystal display 100.

Now, the following will describe concrete examples of the lighting system which are suitable for preferred embodiments of the present invention. The present invention is however not limited to the arrangement of the lighting system discussed below; any changes may be made where necessary.

Figure 6:
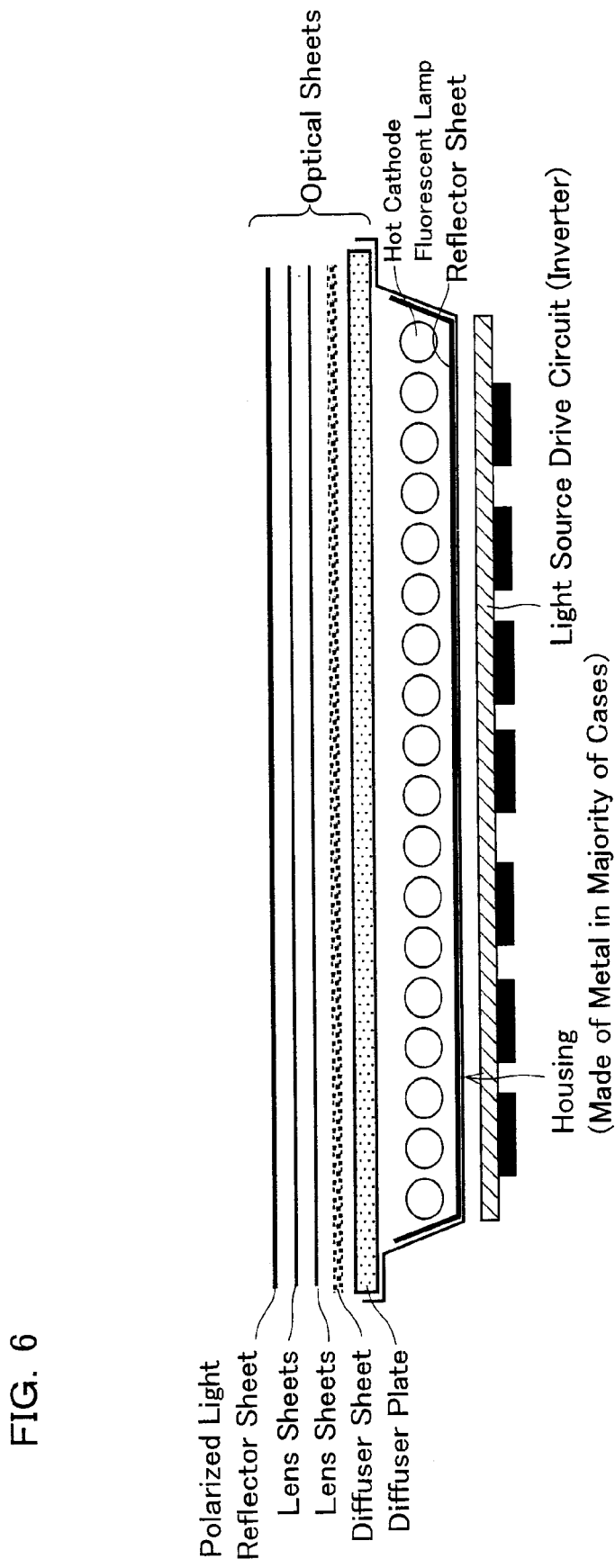
FIG. 6 is a schematic structural diagram of a backlight provided in the liquid crystal display shown in FIG. 1.

The liquid crystal display 100 according to a preferred embodiment of the present invention, due to its display mechanism, needs a more powerful backlight than conventional liquid crystal panels. In addition, the display 100 absorbs notably more of short wavelengths than conventional panels; the light source should be a blue one that emits more intense light at short wavelengths. FIG. 6 shows an example of the lighting system which meets these conditions.

Hot cathode fluorescent lamps preferably are used for the liquid crystal display 100 according to a preferred embodiment of the present invention to obtain luminance similar to conventional panels. The prominent feature of the hot cathode fluorescent lamp is that it outputs about 6 times as intense light as a cold cathode fluorescent lamp with typical specifications.

Taking a 37-inch WXGA-format display as an example of the standard liquid crystal display, 18 of the lamps are arranged on an aluminum housing. Each lamp has an external diameter ($=\phi$) of about 15 mm, for example. The housing includes a white reflector sheet made of resin foam for efficient usage of the light emitted backward from the lamps. The power supply for the lamps is provided on the back of the housing to drive the lamps on the household power supply.

Next, a translucent white resin plate is necessary to eliminate images of the lamps in the housing because the lamps are used for direct backlighting. A 2-mm thick plate member made primarily of polycarbonate is placed on the housing for the lamps. Polycarbonate exhibits high resistance to wet warping and heat deformation. On top of the member are provided optical sheets (specifically, from the bottom, a diffuser sheet, two lens sheets, and a polarized light reflector sheet), so as to achieve predetermined optical effects. With these specifications, the backlight is about 10 times as bright as typical conventional specifications: i.e., 18 cold cathode fluorescent lamps ($\phi=4$ mm), two diffuser sheets, and a polarized light reflector sheet. The 37-inch liquid crystal display according to the present preferred embodiment of the present invention is hence capable of about 400 cd/m$^2$ luminance, for example.

The backlight discharges as much as 5 times more heat than a conventional backlight. The heat is progressively discharged to air from a fin and forcefully ejected through air flow created by a fan, both being provided on the back of the back chassis.

The mechanical members of the lighting system double as major mechanical members for a whole liquid crystal module. The backlight is attached to the fabricated panels which already have a complete set of components mounted thereto. A liquid crystal display controller (including panel drive circuits and signal distributors), a light source power supply, and in some cases a general household power supply are also attached to complete the manufacture of the liquid crystal module. The backlight is attached to the fabricated panels which already have a complete set of components mounted thereto, and a framework is disposed to hold the panels together. That completes the manufacture of the liquid crystal display according to the present preferred embodiment of the present invention.

The present preferred embodiment preferably includes a direct backlighting system using a hot cathode fluorescent lamp. Alternatively, the lighting system, depending on application, may be of a projection type or an edge-lit type. The light source may be cold cathode fluorescent lamps, LEDs, OELs, or electron beam fluorescence tubes. Any optical sheets may be selected for a suitable combination.

In the preferred embodiment above, the slits are provided in the pixel electrodes of the active matrix substrate, and the alignment controlling projections are provided on the color filter substrate, so as to control the alignment direction of the vertical alignment liquid crystal molecules. As another preferred embodiment, the slits and projections may be transposed. Furthermore, slits may be provided in the electrodes of both substrates. An MVA liquid crystal panel may be used which has alignment controlling projections on the surfaces of the electrodes of both the substrates. Besides the MVA type, a pair of vertical alignment films may be used which establish orthogonal pre-tilt directions (alignment treatment directions). Alternatively, VA mode in which liquid crystal molecules are twist-aligned may be used. This particular VA mode is in some cases termed VATN (Vertical Alignment Twisted Nematic) mode. The VATN mode is preferable in the present preferred embodiment because contrast is not reduced by the light leaking through the alignment controlling projections. The pre-tilt is established by, for example, optical alignment.

Figure 7:
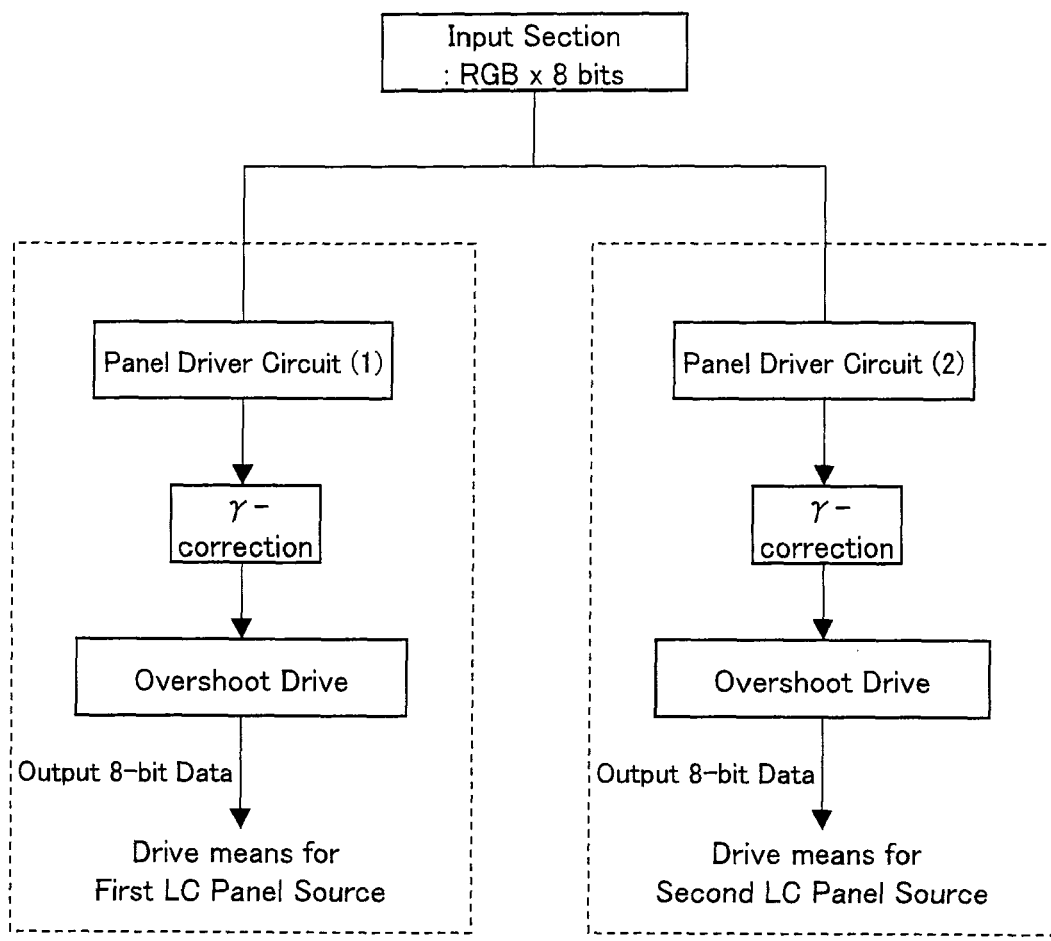
FIG. 7 is a block diagram of a display controller, a drive circuit which drives the liquid crystal display shown in FIG. 1.

Referring to FIG. 7, the following will describe a specific example of a driving method implemented by the display controller of the liquid crystal display 100 constructed as above. Assume 8-bit (256 gray levels) inputs and 8-bit liquid crystal drivers.

The panel drive circuit (1) in the display controller section performs γ-correction, overshooting, and other drive signal processing on input signals (video source) to output 8-bit gray level data to a source driver for the first liquid crystal panel.

Meanwhile, the panel drive circuit (2) performs γ-correction, overshooting, and other signal processing to output 8-bit gray level data to a source driver for the second liquid crystal panel.

Both the first and second liquid crystal panels are able to handle 8-bit data; the resultant output is 8-bit images. The output and input signals have a one-to-one relationship. Input signals are faithfully reproduced.

According to patent document 7, when the gray level changes from a low to a high, the gray level on each panel does not increase continuously. For example, when the luminance increases from 0 to 1, 2, 3, 4, 5, 6, . . . , the gray levels on the first and second liquid crystal panels change from (0, 0) to (0, 1), (1, 0), (0, 2), (1, 1), (2, 0) . . . . Thus, the gray level on the first liquid crystal panel changes from 0 to 0, 1, 0, 1, 2. The gray level on the second liquid crystal panel changes from 0 to 1, 0, 2, 1, 0. Neither gray levels increase monotonously. However, overdrive and many other signal processing technologies for liquid crystal displays require that gray level changes to be monotonous because the technologies use algorithm which involves interpolation calculations. To handle the non-monotonous changes, all the gray level data should be stored in memory. That may lead to increased circuit complexity and cost for display control circuitry and ICs.

Joining the first and second liquid crystal display panels as described above leads to the following new problems.

The liquid crystal display with two liquid crystal display panels being stacked (hereinafter, "double-panel liquid crystal display") contains more polarizers and liquid crystal layers than the liquid crystal display with one liquid crystal display panel (hereinafter, "single-panel liquid crystal display"); the double-panel liquid crystal display inevitably has lower transmittance across the spectrum than the single-panel liquid crystal display. In order to compensate, radiation from the lighting system which provides light to the double-panel liquid crystal display may be increased.

However, if the radiation is raised, the lighting system generates more heat, which is not desirable.

The illumination of low-transmittance panels by visible light so intense that sufficient luminance of the panels is ensured renders the energy turning into heat by the absorption by the panels creates another problem that cannot be ignored.

There are problems with circuit components too. Driving the double-panel liquid crystal display requires a greater number of circuit components. Complex drive control could lead to high temperature.

Figure 17:
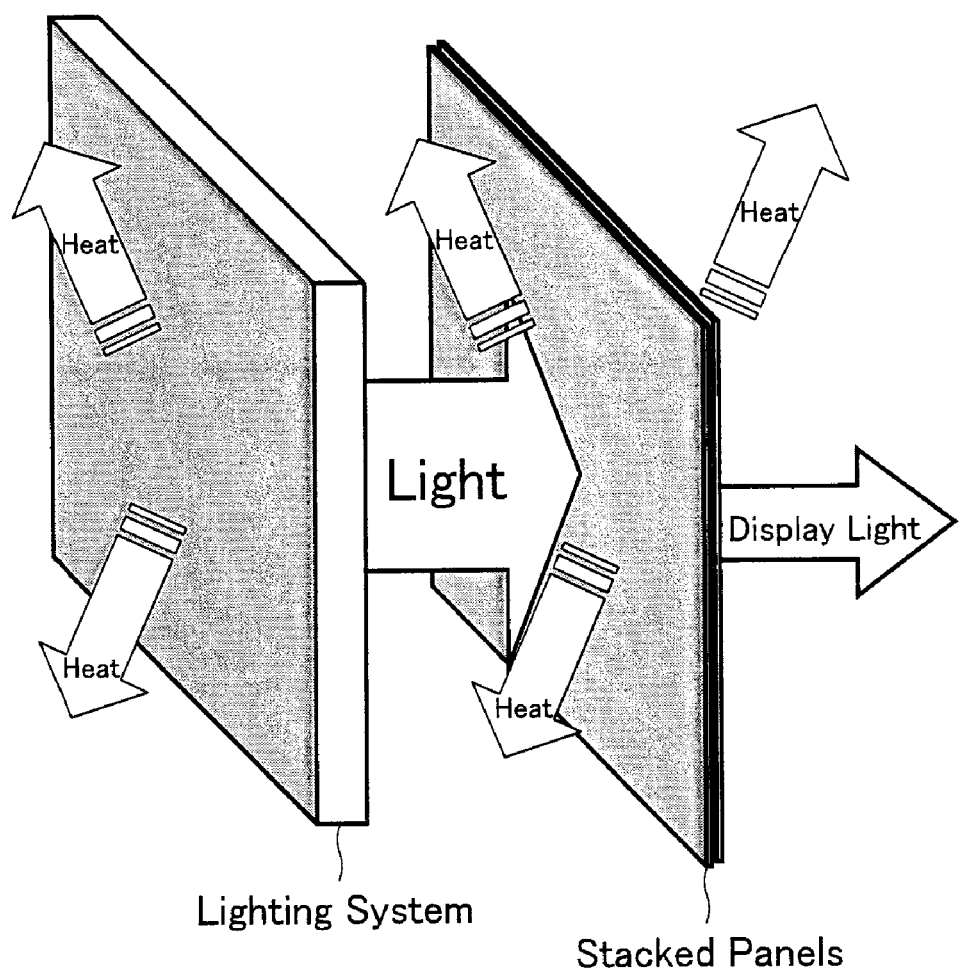
FIG. 17 is a schematic illustration of heat generating mechanism in the liquid crystal display.

The heating of the liquid crystal display may be caused, as illustrated in FIG. 17, by self-heating of the lighting system and absorption by the joined panels of the light from the lighting system. The problems may be addressed by cooling the lighting system, cooling the joined panels, or cooling both of them to cool the liquid crystal display down.

Specifically, the following six cooling techniques may be possible.

Air Cooling: Dispose a Fan

Water cooling: Circulate liquid between hot, target spots and outside where the heat is discharged.

Radiator fin (added surface area): See Japanese Registered Utility Model Publication (Jitsukaihei 4-79330)

Radiation: Some substances, e.g., baked inorganic materials (ceramics), efficiently radiate heat energy in the form of electromagnetic waves. Exploit this property by providing ceramics either in the heat source or the object which receives the thermal radiation. No metal should be placed in the path between the heat source and absorber because metal makes a good heat conductor, but it reflects radiation.

Forced cooling using cooling medium (compressor method): Compress a gaseous substance or a substance that could easily change between the gaseous and liquid states in a compressor, send it into a path to let it expand down the path, and circulate it back to the compressor. "Expansion" encompasses "gassification." As the substance expands, it cools down that site.

Direct heat conduction: Form a physical contact to create a heat flow from a high-temperature object to a low-temperature object, reducing the temperature of the high-temperature object. Specifically, dispose rubber with a high thermal conductivity on the drivers and other components that could be a heat source so that the heat flows through the rubber to a large mechanical member such as a metal chassis.

The following 6 sites may be targeted in the cooling. Feasible cooling methods are selected from (1) to (6) above and given for each site.

Back of the backlight chassis: (1) to (6) are all applicable.

Back of each panel: Use a transparent liquid in (1) or (2) or a transparent inorganic particle layer (diffusion) in (4).

Front of each panel: Same as in (II).

Space between panels: Same as in (II).

Room accommodating the lamp of the direct backlighting system: Forced external ventilation in (1). Dispose a heat discharger outside the device in (2) or (5).

Drivers and other panel drive electronic components: (1) to (6) are all applicable.

The following preferred embodiments will describe examples of the cooling methods for the liquid crystal display.

First Preferred Embodiment

A preferred embodiment of the present invention will be described.

Figure 18A:
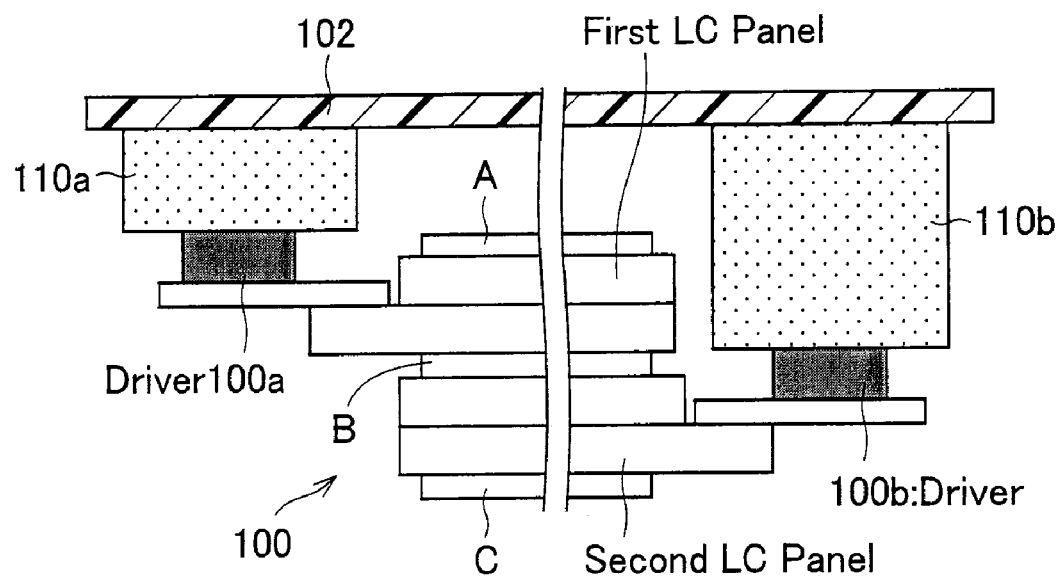
FIG. 18A illustrates a heat discharge structure for the liquid crystal display according to a preferred embodiment of the present invention.

As shown in FIG. 18A, a framework 102 for a double-panel liquid crystal display 100 is connected onto panel drivers 100a, 100b via heat conducting members 110a, 110b.

The heat conducting members 110a, 110b are made of a material having high heat conductivity, for example, silicon rubber with a filler. The heat conducting members 110a, 110b are preferably made of a soft material, such as rubber, to reduce stress exerted on circuit components.

Figure 18B:
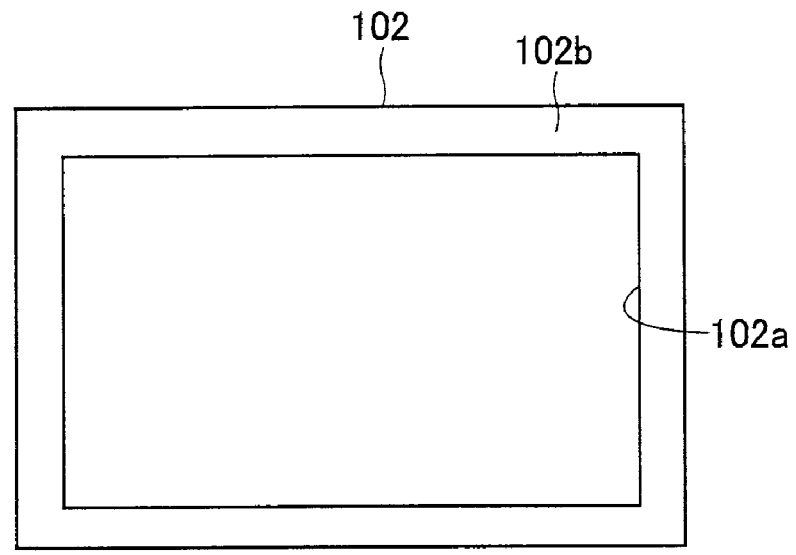
FIG. 18B illustrates a heat discharge structure for the liquid crystal display according to a preferred embodiment of the present invention.

Referring to FIG. 18B, the framework 202 includes an opening 102a and a frame 102b. The opening 102a is formed at a position which matches the display screen. The frame 102b surrounds the opening 102a. The framework 202 is a framework, sometimes called a bezel or by other terms, which pushes the panels from the side of the display plane. Heat is intended to flow from the heat conducting members 110a, 110b to the framework 200.

The structure enables the heat resulting from the increased amount of light produced in the liquid crystal display 100 by the backlight to be discharged from the heat conducting members 110a, 110b to the framework 102. That in turn allows increase in the luminance.

Figure 19A:
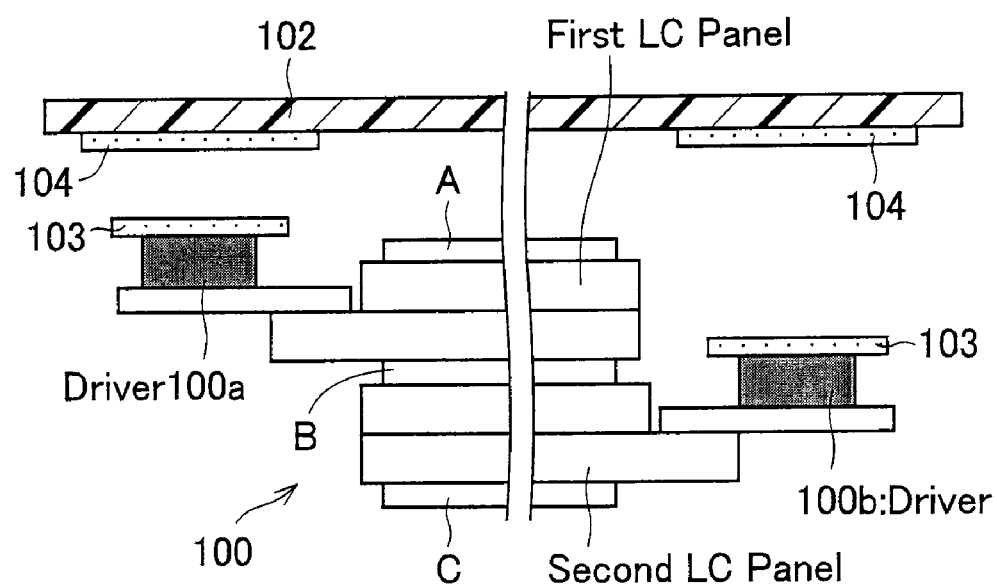
FIG. 19A illustrates another heat discharge structure for the liquid crystal display according to a preferred embodiment of the present invention.
Figure 19B:
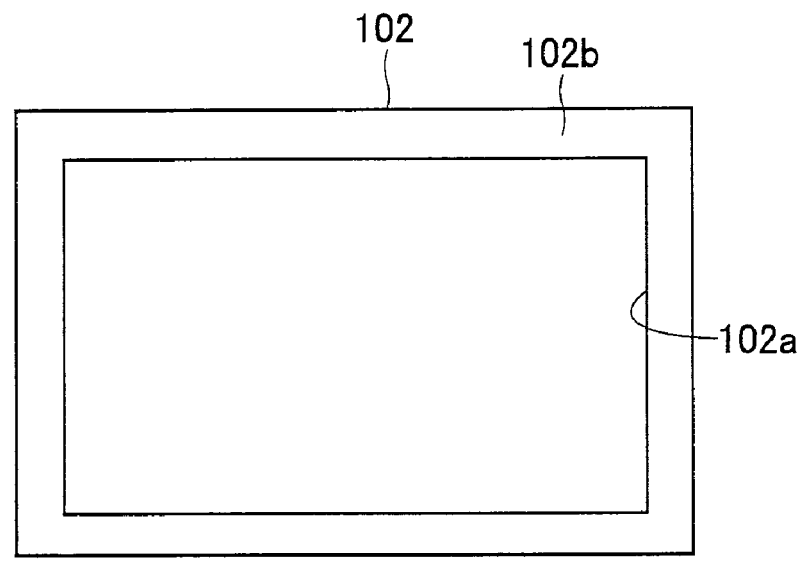
FIG. 19B illustrates another heat discharge structure for the liquid crystal display according to a preferred embodiment of the present invention.

Rubber (e.g., the heat conducting members 110a, 110b) is not the only possible heat conducting device or elements. An alternative is shown in FIGS. 19A and 19B, including heat dischargers 103 and heat absorbers 104. The heat dischargers 103 may be coated with a ceramic containing a baked oxide of a metal (Al, Mg) and disposed respectively on the drivers 100a, 100b. The heat absorbers 104 may be made of the same material as the heat discharger 103 and disposed on the framework 102 opposite the heat dischargers 103.

There is no contact between the heat dischargers 103 on the driver and the heat absorbers 104 on the framework. The heat discharged by the heat discharger 103 is however absorbed by the heat absorbers 104 spaced apart from each other. The dischargers and absorbers have similar effects to the heat conducting members.

Cooling methods will be described for a liquid crystal display of a direct backlighting type in reference to FIG. 20 and a liquid crystal display of an edge-lit backlight type in reference to FIG. 20.

Figure 20:
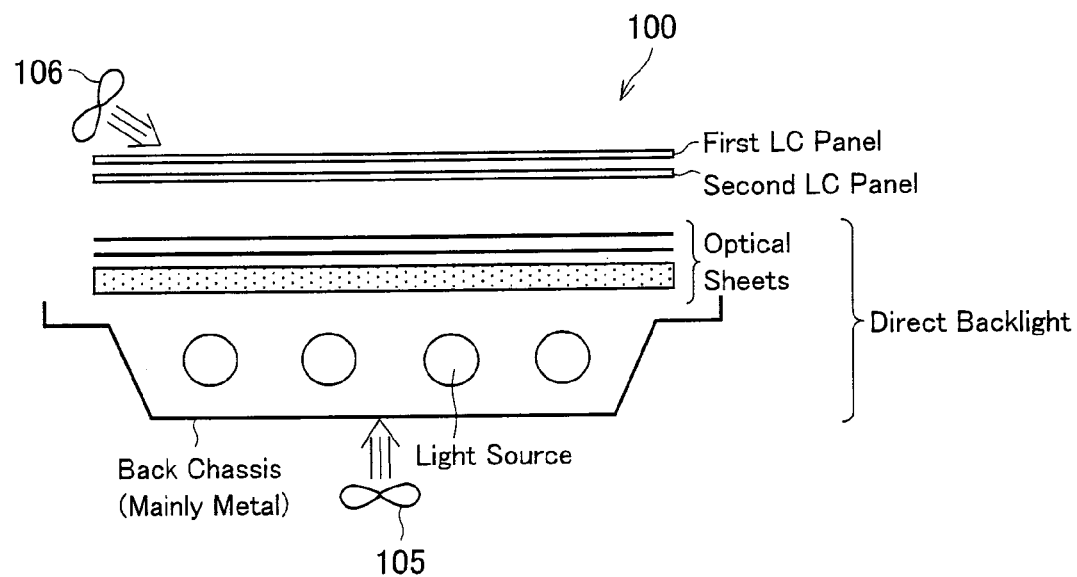
FIG. 20 illustrates a typical structure of the backlight for the liquid crystal display.

As shown in FIG. 20, a typical backlight is provided with a back chassis covering a light source. A large majority of back chassis are made of a metal and can be cooled by providing a fan 105 directly blowing air at the back chassis or sucking air from around the back chassis. There is also provided a fan 106 blowing air at the front of the first liquid crystal panel in the liquid crystal display, to cool down the second liquid crystal panel.

Figure 21:
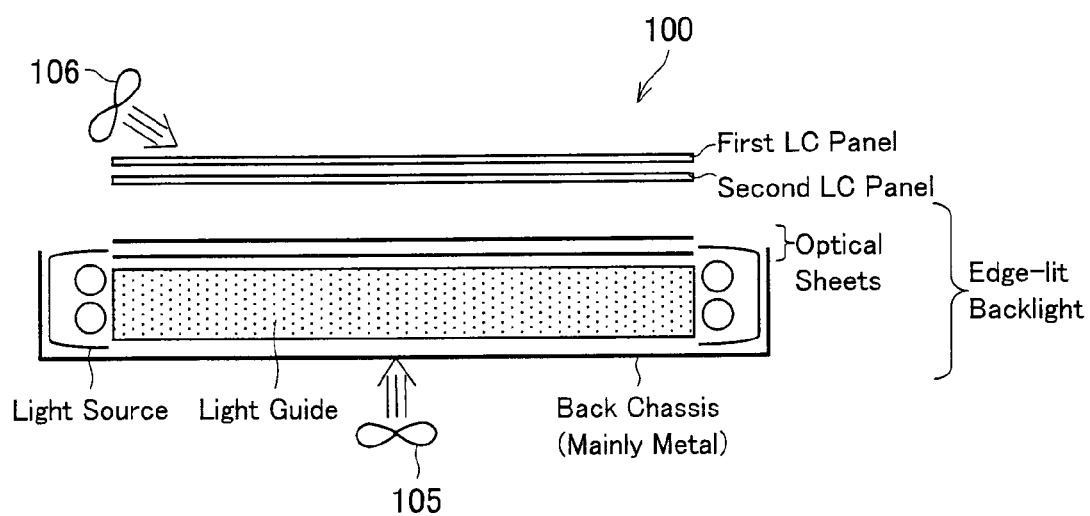
FIG. 21 illustrates a typical structure of the backlight for the liquid crystal display.

The same structure as the direct backlight shown in FIG. 20 is applicable to the edge-lit backlight shown in FIG. 21. The back chassis covering the light source is primarily made of a metal. Therefore, there is provided a fan 105 blowing air at the back chassis and also a fan 106 directly blowing air at the second liquid crystal panel, to cool down the entire liquid crystal display.

As described in the foregoing, the back chassis includes a housing for lamps and the largest, definable back face mechanical member and is made primarily of aluminum, stainless steel, or iron. In the liquid crystal display, the back chassis is the largest physical reinforcement component and heat absorber in heat discharge.

Therefore, the liquid crystal display can discharge more effectively through the cooling of the back chassis.

Figure 22:
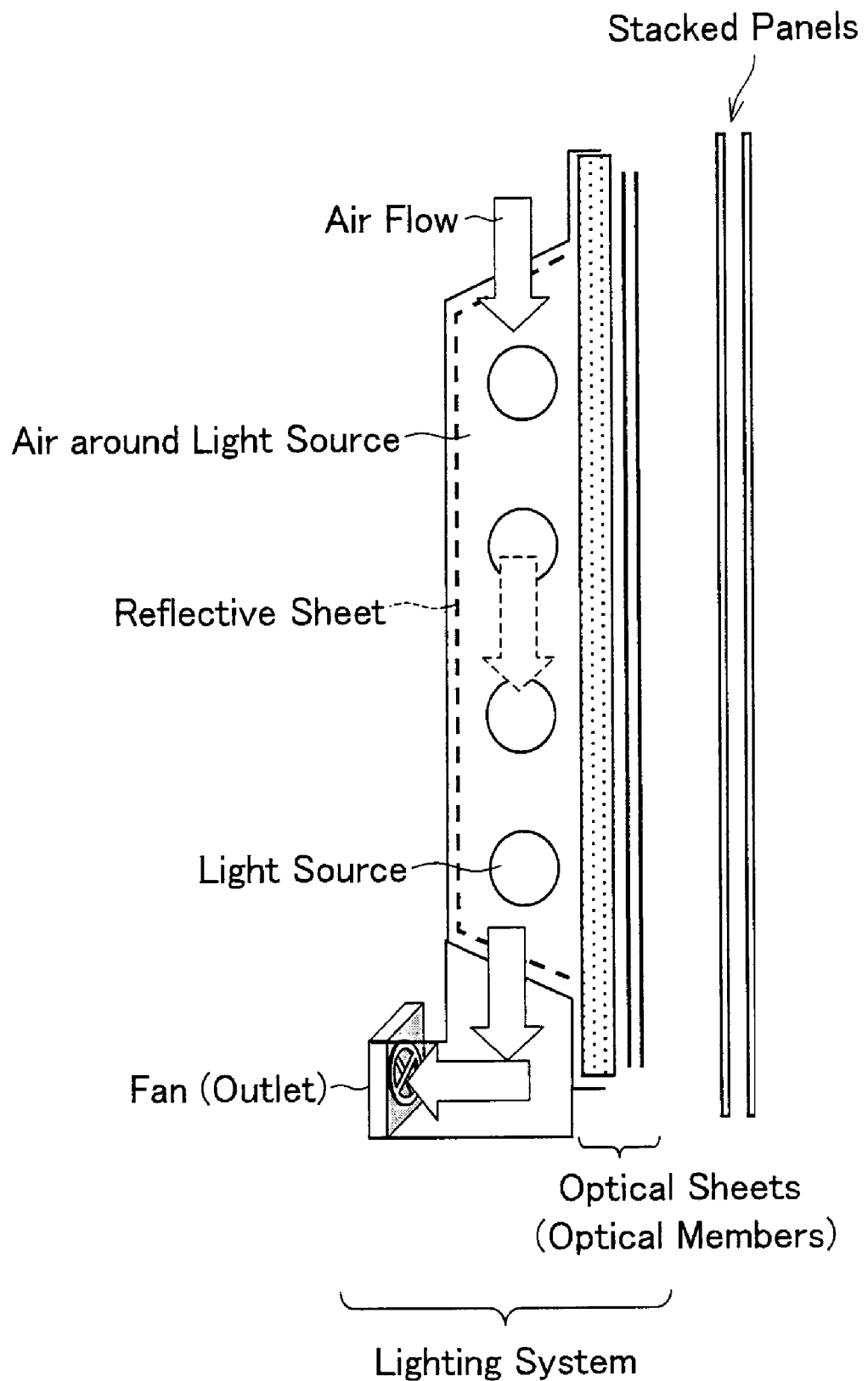
FIG. 22 illustrates a heat discharge structure for the liquid crystal display according to a preferred embodiment of the present invention.

Another feasible structure is shown in FIG. 22. The lighting system includes a light source, a reflection layer, and an optical member. The reflection layer is disposed surrounding the light source, to collect light from the light source in a predetermined direction. The optical member, receiving the collected light, delivers predetermined optical effects. The lighting system cooling device preferably includes a fan arranged to forcefully vent air from around the light source surrounded by the reflection layer and the optical member of the lighting system. The structure vents the air from the surroundings of the lamps. Forced ventilation achieved by further provision of a discharge port and a suction port along with the fan enables rapid internal cooling. Furthermore, the suction port is preferably equipped with a filter to prevent dust from entering the system.

Figure 23:
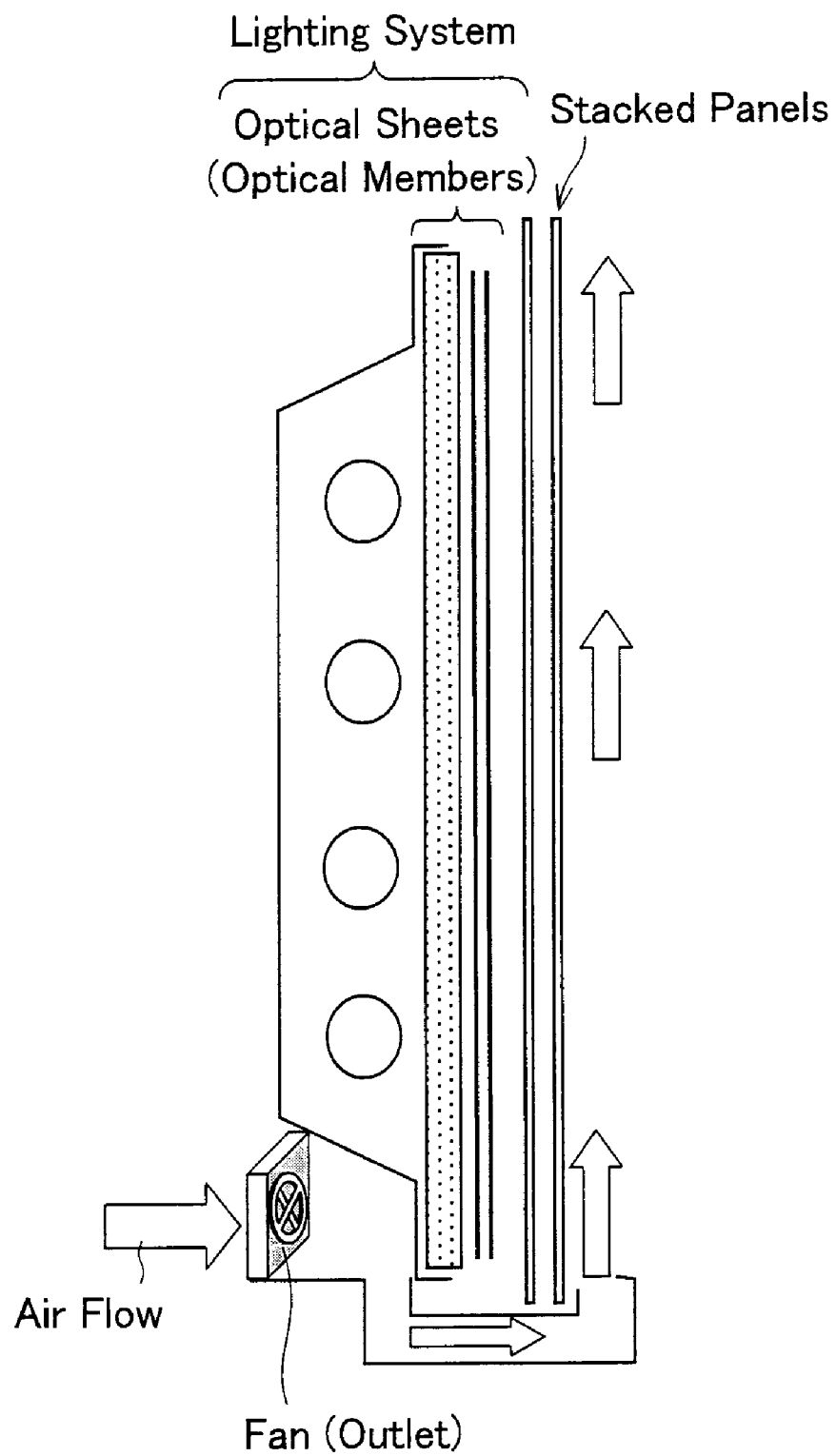
FIG. 23 illustrates another heat discharge structure for the liquid crystal display according to a preferred embodiment of the present invention.

Another feasible structure is shown in FIG. 23. The cooling device includes a fan generating an air flow outside a display active area along the display active area (panel surface) formed by stacking the first liquid crystal panel and the second liquid crystal panel. The provision enables the creation of a forced air flow over the panel surface. That in turn enables the cooling of the panel that is dissipating heat under intense visible light. The suction port is preferably equipped with a filter to prevent dust from entering the system.

Figure 24:
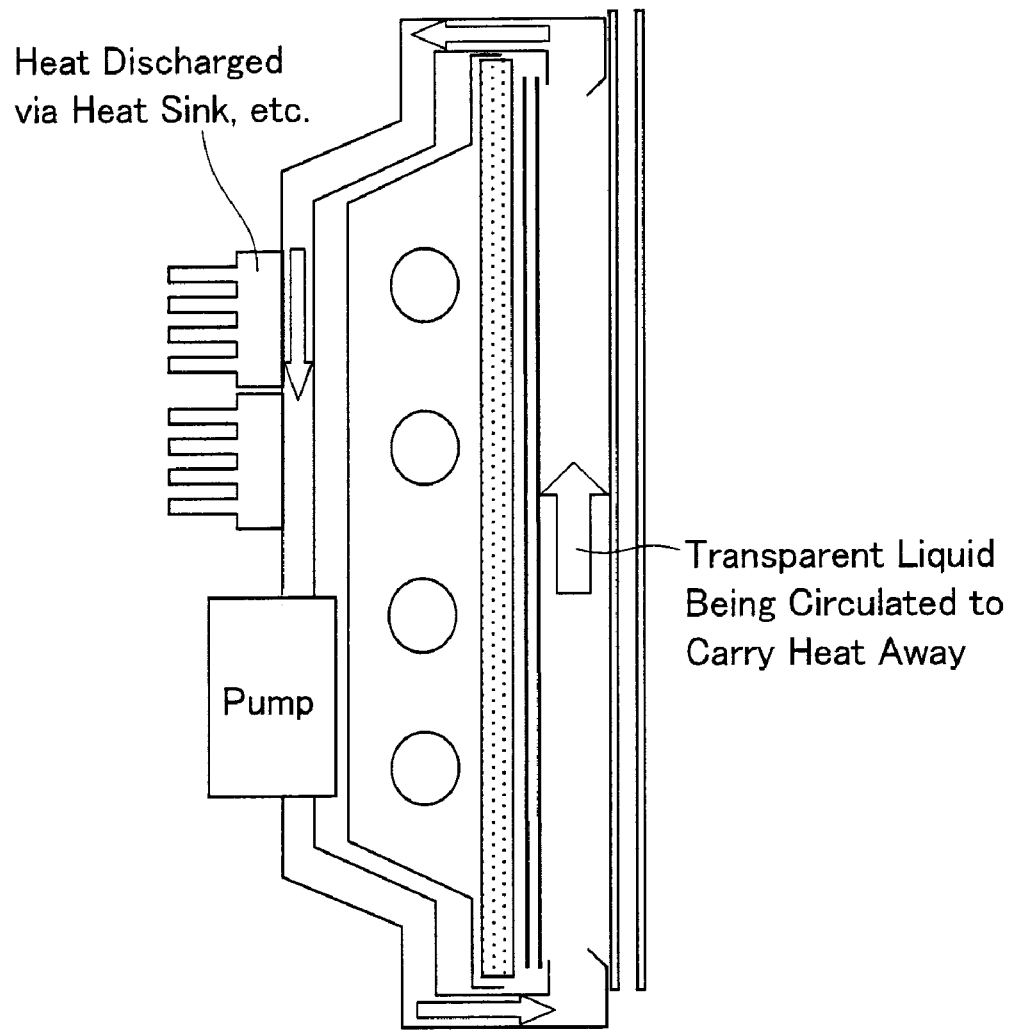
FIG. 24 illustrates a further heat discharge structure for the liquid crystal display according to a preferred embodiment of the present invention.

Another feasible structure is shown in FIG. 24. The display includes a lighting system delivering display light to the stacked panels from behind the panels. The cooling device includes a pump creating circulation of transparent fluid in the space formed between the stacked panels and the lighting system. The structure enables the transparent liquid to circulate between the lighting system and the panels, carrying heat away, so as to discharge the heat through a heatsink. That in turn prevents direct heat conduction from the lighting system and at the same time enables cooling of the panels being heated up under visible light.

Figure 25:
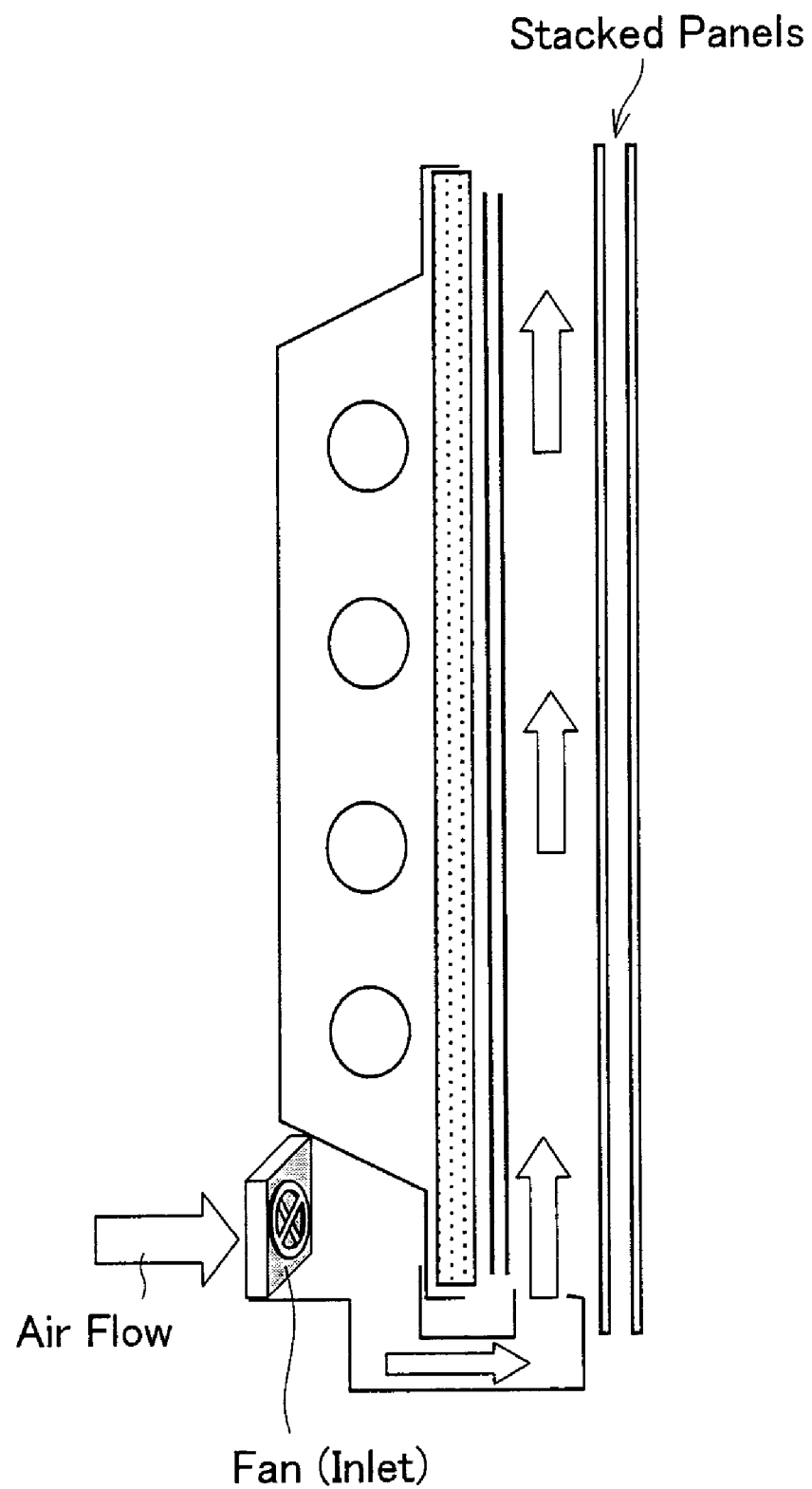
FIG. 25 illustrates yet another heat discharge structure for the liquid crystal display according to a preferred embodiment of the present invention.

Another feasible structure is shown in FIG. 25. The display includes a lighting system delivering display light to the stacked panels from behind the panels. The cooling device includes a fan venting air from the space formed between the stacked panels and the lighting system to the outside, thereby enabling venting air from between the lighting system and the panels. The structure prevents direct heat conduction from the lighting system and at the same time enables cooling of the panels being heated up under visible light. The suction port is preferably equipped with a filter to prevent dust from entering the system.

Figure 26:
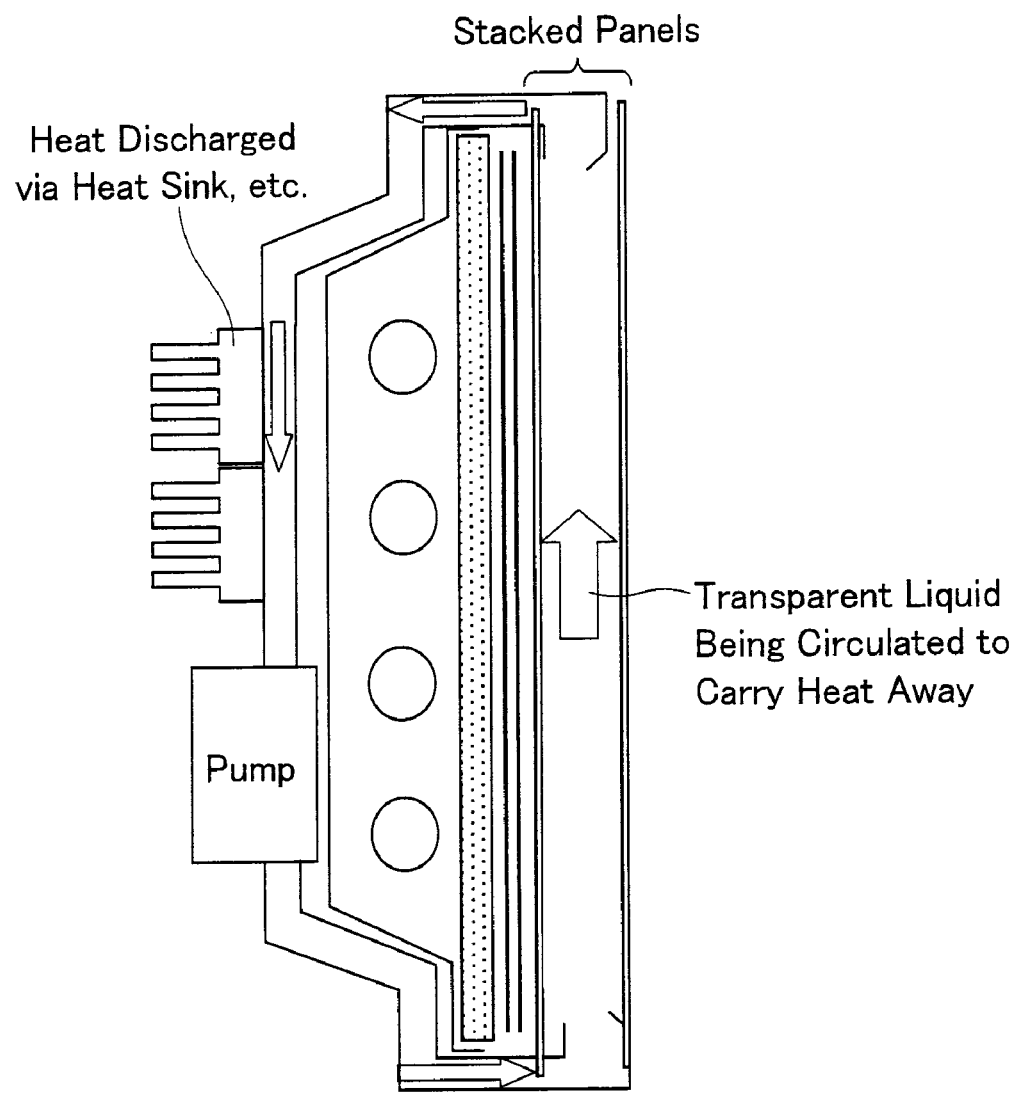
FIG. 26 illustrates still another heat discharge structure for the liquid crystal display according to a preferred embodiment of the present invention.

Another feasible structure is shown in FIG. 26. The cooling device includes a pump creating circulation of transparent fluid in the space formed between the first liquid crystal panel and the second liquid crystal panel of the stacked panels. The structure enables the transparent liquid to circulate between the stacked panels, carrying heat away, so as to discharge the heat through a heatsink. That in turn achieves highly effective panel cooling.

Figure 27:
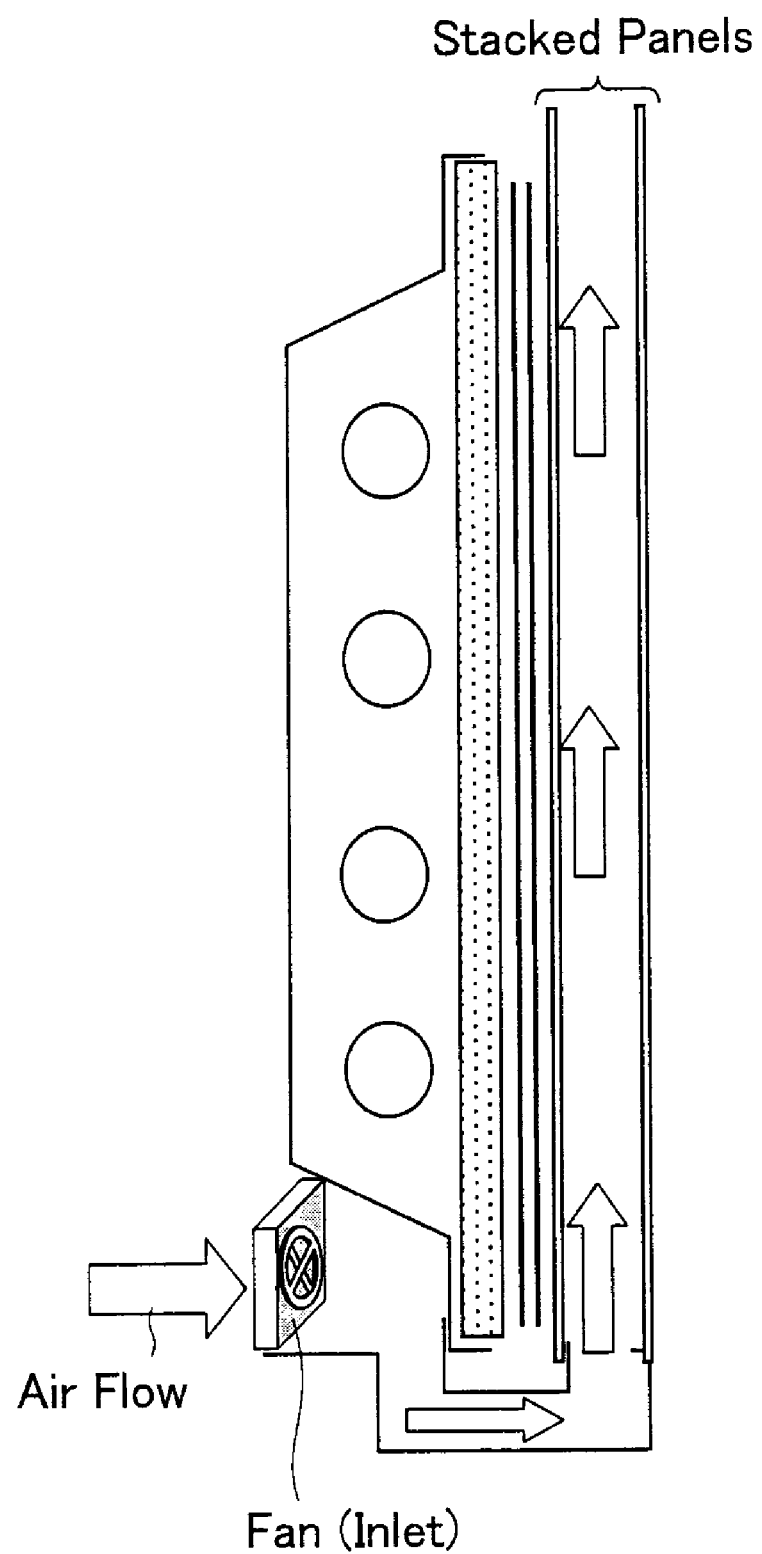
FIG. 27 illustrates another heat discharge structure for the liquid crystal display according to a preferred embodiment of the present invention.

Another feasible structure is shown in FIG. 27. The cooling device includes a vent arranged to vent air from the space formed the first liquid crystal panel and the second liquid crystal panel of the stacked panels to the outside, thereby enabling venting air from between the stacked panels. The structure achieves highly effective panel cooling. The suction port is preferably equipped with a filter to prevent dust from entering the system.

The light source used in the backlight is a cold cathode fluorescent lamp. Especially, among cold cathode fluorescent lamps, the UV source is the one in which Hg is sealed.

Examples of an electric-discharge light source other than cold cathode fluorescent lamps include hot cathode fluorescent lamps. The UV source may use in some cases xenon or krypton.

Both the cold cathode fluorescent lamp and the hot cathode fluorescent lamp are elongated, bar-like light source. Apart from them, the following light sources are used to achieve necessary color reproduction:

LEDs

Planar electric-discharge light sources (e.g., xenon plasma)

Surface emission light source (electron beam fluorescence)

The second preferred embodiment below will describe an example in which the light sources are hot cathode fluorescent lamps.

Second Preferred Embodiment

Figure 28:
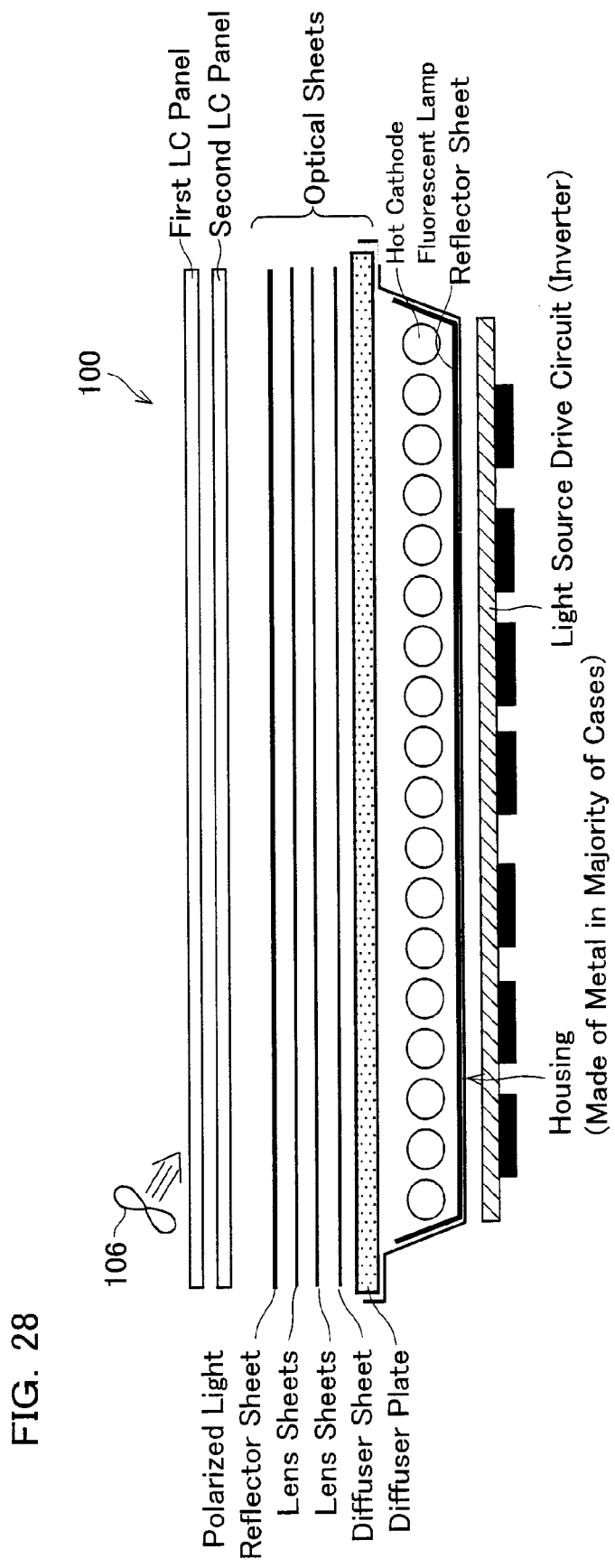
FIG. 28 illustrates a backlight structure for a preferred embodiment of the present invention.

The liquid crystal display of the present preferred embodiment, as shown in FIG. 28, includes two liquid crystal display panels, or the first liquid crystal panel and the second liquid crystal panel, stacked in this order and a direct backlight disposed below the second liquid crystal panel with intervening optical sheets.

The optical sheets are, starting with the one closest to the second liquid crystal panel and sequentially moving away, a polarized light reflector sheet, two lens sheets, a diffuser sheet, and a diffuser plate.

A plurality of hot cathode fluorescent lamps are laid out below the diffuser plate parallel or substantially parallel to a surface of the diffuser plate. A metal housing is provided outside the hot cathode fluorescent lamps.

A reflector sheet is provided on the internal surface the housing to improve on the light usage efficiency by reflecting light from the light source toward the panels.

Figure 29:
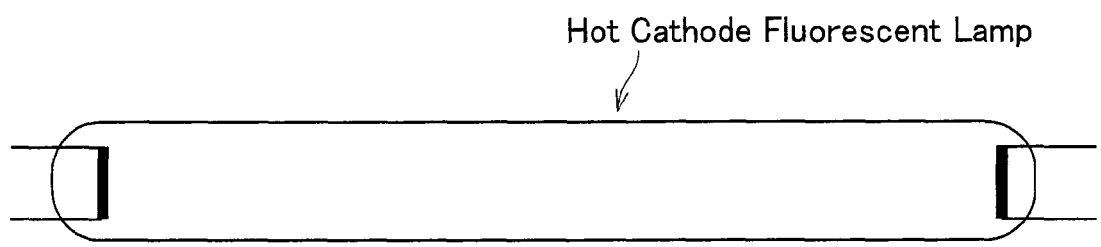
FIG. 29 illustrates an example of the hot cathode fluorescent lamps shown in FIG. 28.

The hot cathode fluorescent lamp, for example, as shown in FIG. 29, contains about 2 mg to about 10 mg Hg as a UV source in about 10-Torr Ar gas, for example. The lamp also has a tungsten filament of which the emitter is coated. The emitter here refers to an oxide of calcium, magnesium, etc. A method is often used by which carbon dioxide is removed any of the carbonates.

Figure 30:
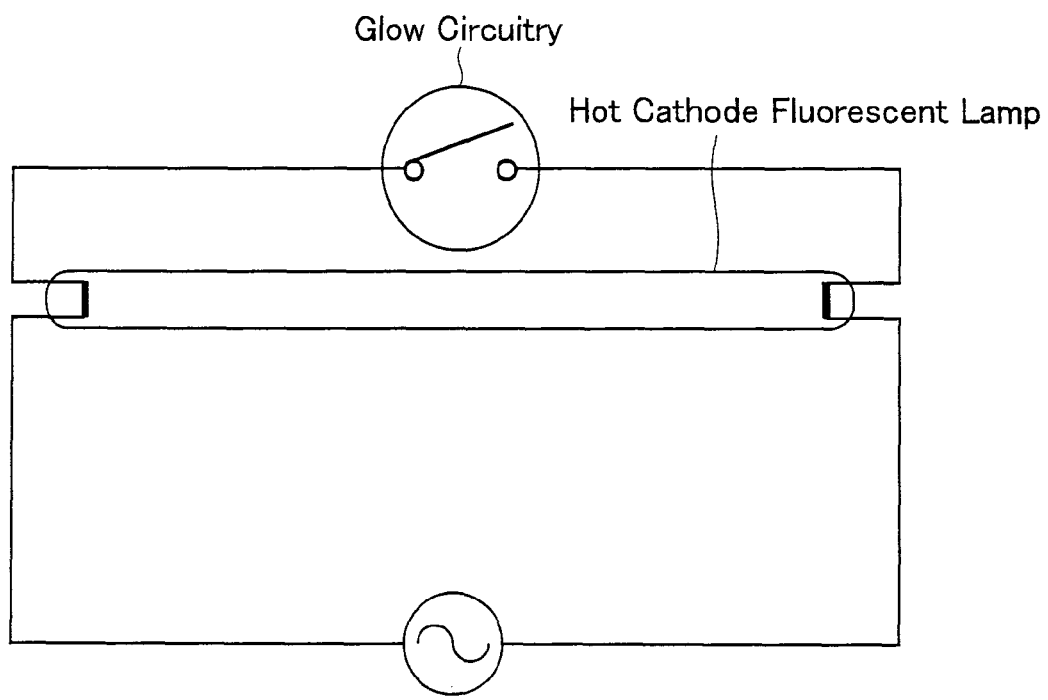
FIG. 30 illustrates a drive circuit which drives the hot cathode fluorescent lamp shown in FIG. 29.

The hot cathode fluorescent lamps constructed as above are driven by a drive circuit shown in FIG. 30. The circuit is glow circuit which short-circuits at or above a certain voltage and opens at or below that voltage. The present invention is in no way limited to this driving method.

As described in the foregoing, if hot cathode fluorescent lamps are used as a light source for the backlight, each lamp is capable of efficiently emitting intense light, produces little heat and can be driven by low voltage in comparison to a cold cathode fluorescent lamp. The hot cathode fluorescent lamps can therefore be placed relatively close to each other, achieving high density emission (high luminance).

Accordingly, increased luminance, which could not achieved with cold cathode fluorescent lamps, becomes feasible with hot cathode fluorescence lamps. This configuration is a preferred embodiment of the present invention.

Although hot cathode fluorescence lamps are more efficient than cold cathode fluorescent lamps, if the hot cathode fluorescence lamps are used at a high density, heat discharge grows considerably large with increasing electric power being fed. The liquid crystal display needs to be cooled as described in first preferred embodiment in reference to FIGS. 20 to 27.

For example, the heat generated by the backlight is conducted to the housing where it is discharged. That heat is also directly transferred via air and the members constituting the liquid crystal display panels. Furthermore, most visible light converts to heat in the liquid crystal display panels, raising their temperature. Accordingly, as describe in the first preferred embodiment in reference to FIG. 20, two cooling devices need to be provided, one for cooling down the housing and the other for cooling down the surface of the first liquid crystal panel outside the liquid crystal panels.

The cooling device for cooling down the housing may be an air cooling fan shown in FIG. 20. The cooling device for cooling down the surface of the first liquid crystal panel may be an air cooling fan shown in FIG. 20 or cold water flowing on the surface of the first liquid crystal panel.

Third Preferred Embodiment

In the previous preferred embodiments, the two liquid crystal panels in the liquid crystal display 100 each preferably have a color filter. The present preferred embodiment will describe an example of liquid crystal panels only either one of which is provided with a color filter. The change enables skipping an RGB formation step when compared with a color filter being provided in each of the liquid crystal panels, which is advantageous in terms of cost.

Figure 31:
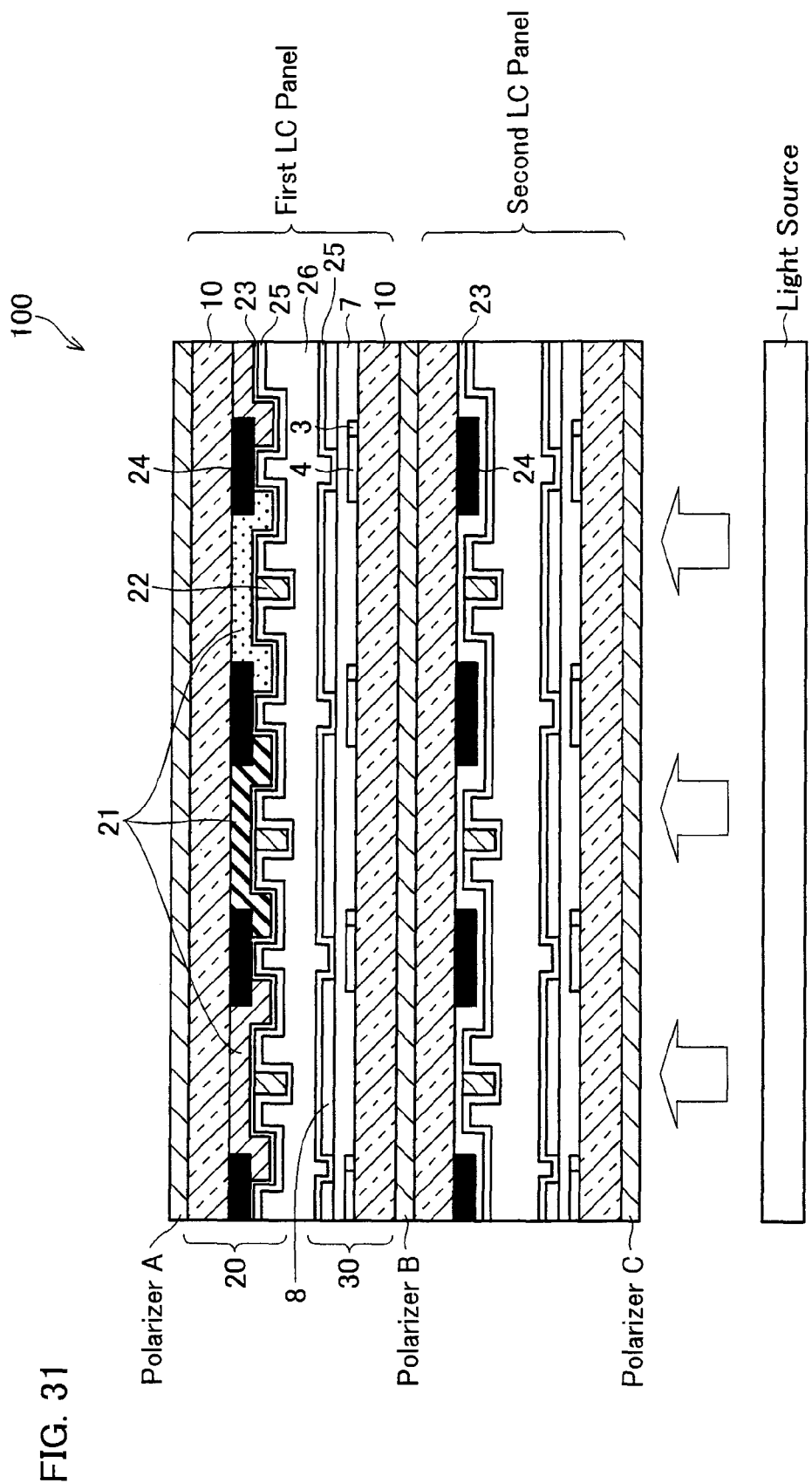
FIG. 31 is a schematic cross-sectional view of a liquid crystal display, illustrating a preferred embodiment of the present invention.
Figure 32:
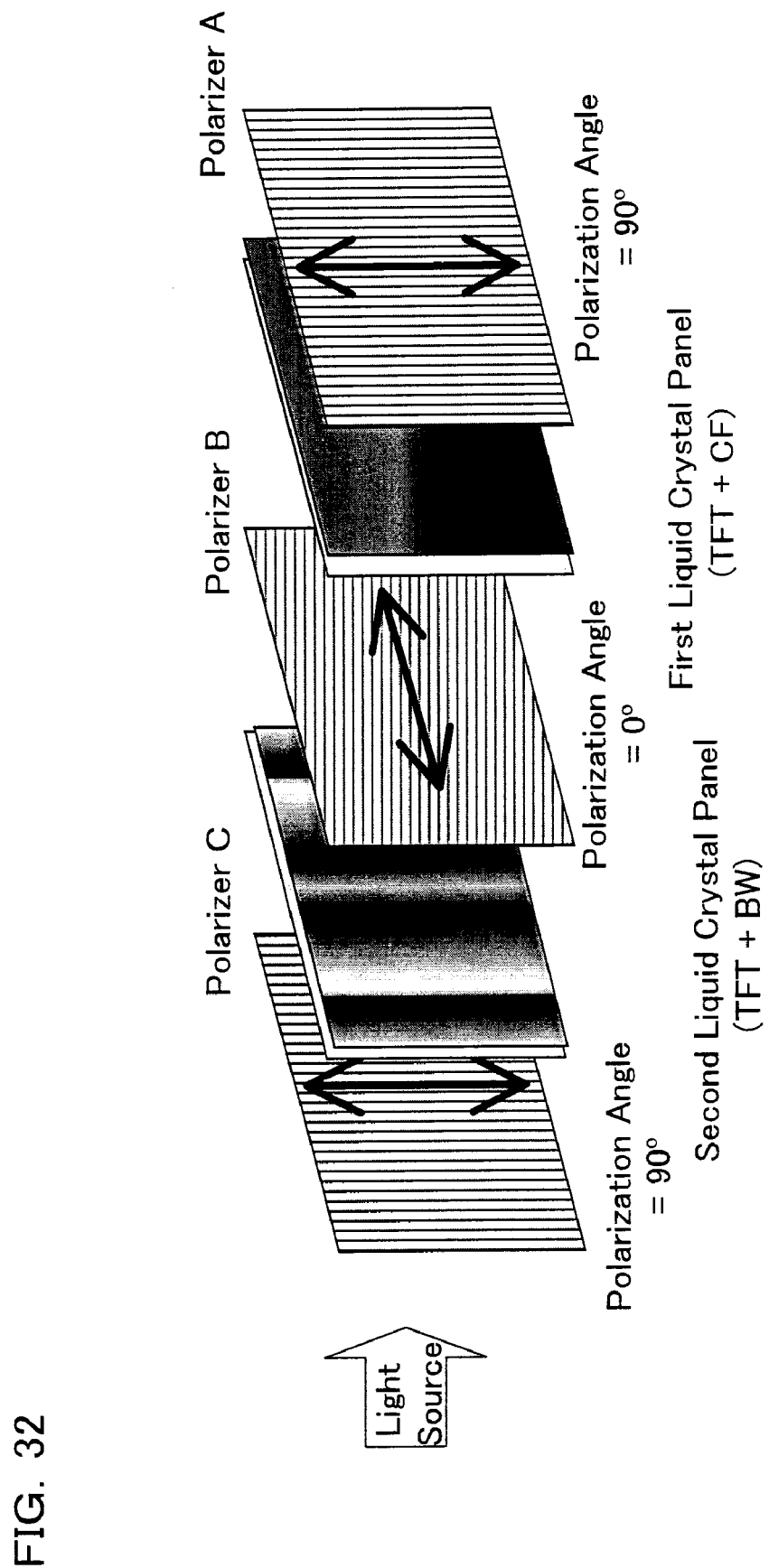
FIG. 32 illustrates the positional relationship of polarizers and panels in the liquid crystal display shown in FIG. 31.

The present preferred embodiment will be described in reference to FIGS. 31, 32. FIG. 31 is a schematic cross-sectional view of a liquid crystal display, illustrating the present preferred embodiment based on the present invention. FIG. 32 illustrates the structure of a liquid crystal display having polarizers.

The liquid crystal display 100 shown in FIG. 31 differs from the liquid crystal display 100 shown in FIG. 1 in that the second liquid crystal panel has no color filter 21 and it is only the first liquid crystal panel that includes a color filter 21.

If the same color reproducibility with conventional examples needs to be maintained, the color filter 21 of the first liquid crystal panel is as thick as the color filter 21 in conventional, single-panel structure. The color filter 21 of the first liquid crystal panel preferably is about 1.8 μm thick, for example. The second liquid crystal panel containing no color filter 21 is driven based on the first liquid crystal panel containing a color filter 21. For example, the pixel of the second liquid crystal panel exactly below a blue dot, for a blue display. of the first liquid crystal panel is driven based on the signal for the blue dot on the first panel. For example, identical signals may be supplied.

Conversely, the color filter 21 may be provided in the second panel. The panels are otherwise structured and operate the same way as the basic configuration, that is, the liquid crystal display 100 shown in FIG. 1; the description is not repeated.

The liquid crystal display 100 configured as described above requires a single process to fabricate the RGB (three primary colors [red, green, blue]) color filter 21, while the basic configuration, or the liquid crystal display 100 shown in FIG. 1, which is advantageous in terms of cost.

Figure 33:
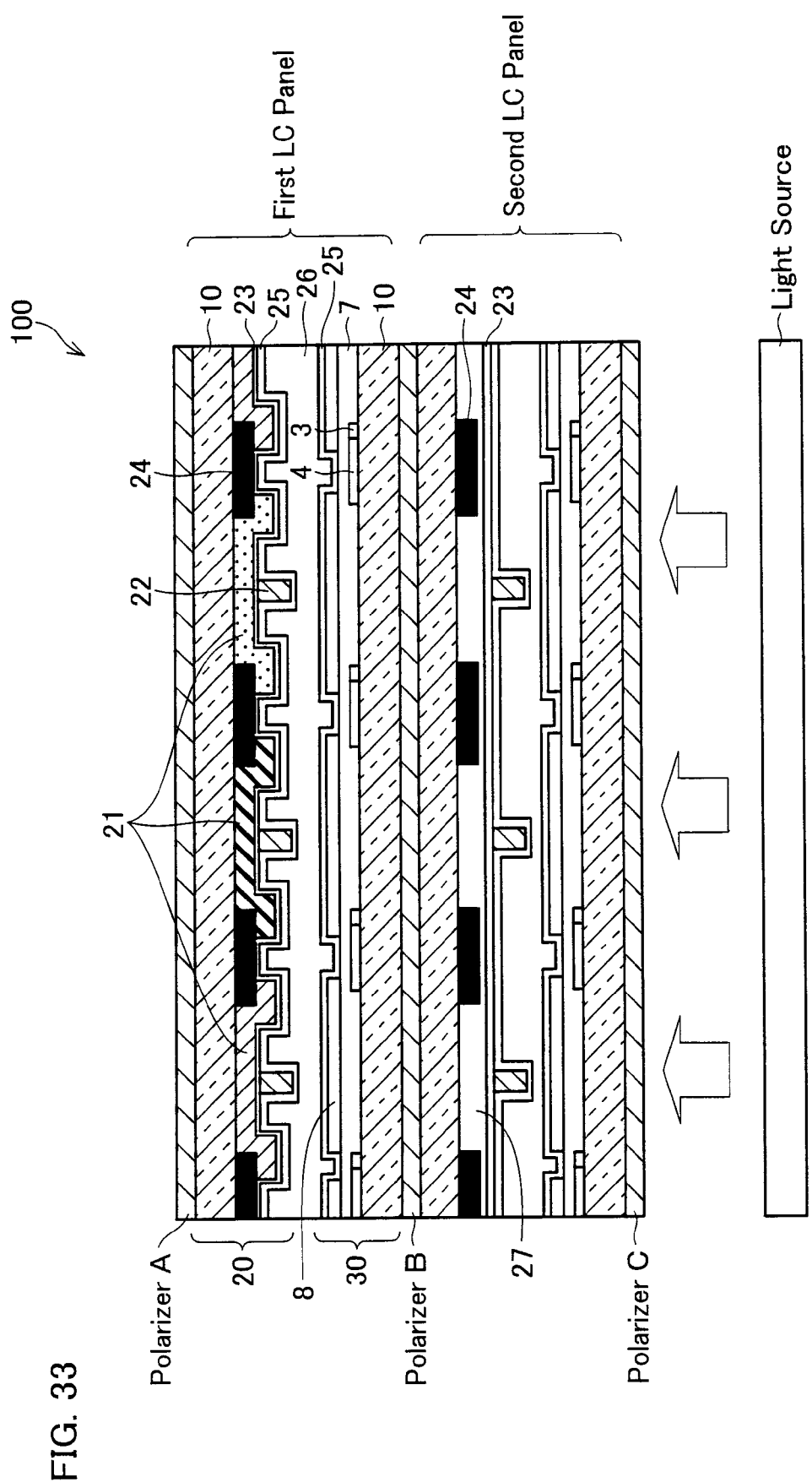
FIG. 33 is a schematic cross-sectional view of a liquid crystal display according to another preferred embodiment of the present invention.

Now, in reference to FIG. 33, another example of the present preferred embodiment will be described. FIG. 33 is a schematic cross-sectional view of a liquid crystal display of a preferred embodiment in accordance with the present invention.

In the liquid crystal display 100 shown in FIG. 31, if a black matrix layer (hereinafter, "BM") 24 is formed of resin in the panel containing no color filter 21 and the BM resin is thick, alignment may be disturbed near edges of the BM (for your information, a resin BM is thicker than a metal BM to compensate for its poor light blocking ability.

The problem is addressable in the liquid crystal display 100 shown in FIG. 33 by forming a transparent layer 27 containing no color pigment at a location where the color filter 21 is formed. The transparent layer 27 may be made from any material, but preferably from a highly transparent, non-colored material.

For example, the transparent layer 27 is preferably made from a negative, acrylic-based photosensitive resin solution photosensitivity containing no color pigment. When that is the case, the photomask originally meant for use in forming a pattern for the color filter 21 mentioned in relation to the manufacturing method of the color filter substrate 20 in the liquid crystal display 100 shown in FIG. 1 may be used also to form a pattern for the transparent layer 27. Alternatively, a dedicated photomask designed for one-shot exposure may be used. Also, a negative photosensitive resin may be used with the BM as a mask, and exposure and development done on the back surface.

In FIG. 33, the overlapping portions of the color filter 21 which extend on the BM 24 are emphasized. A typical acrylic-based photosensitive resin, when applied, is generally far thinner on the BM 24 than other places (where there is no BM 24 underneath). Alignment is likely to be disturbed by the overlapping parts. However, in the liquid crystal display 100 shown in FIG. 33, alignment is not disturbed by overlapping portions.

In the present preferred embodiment (in which the transparent layer 27 is formed), the resin BM 24 has almost the same cross section as it does when the color filter 21 is formed. Alignment is therefore less likely to disturbed along the edges of the resin BM 24.

Accordingly, moire pattern occurrences attributable to alignment disturbance are prevented.

Figure 34:
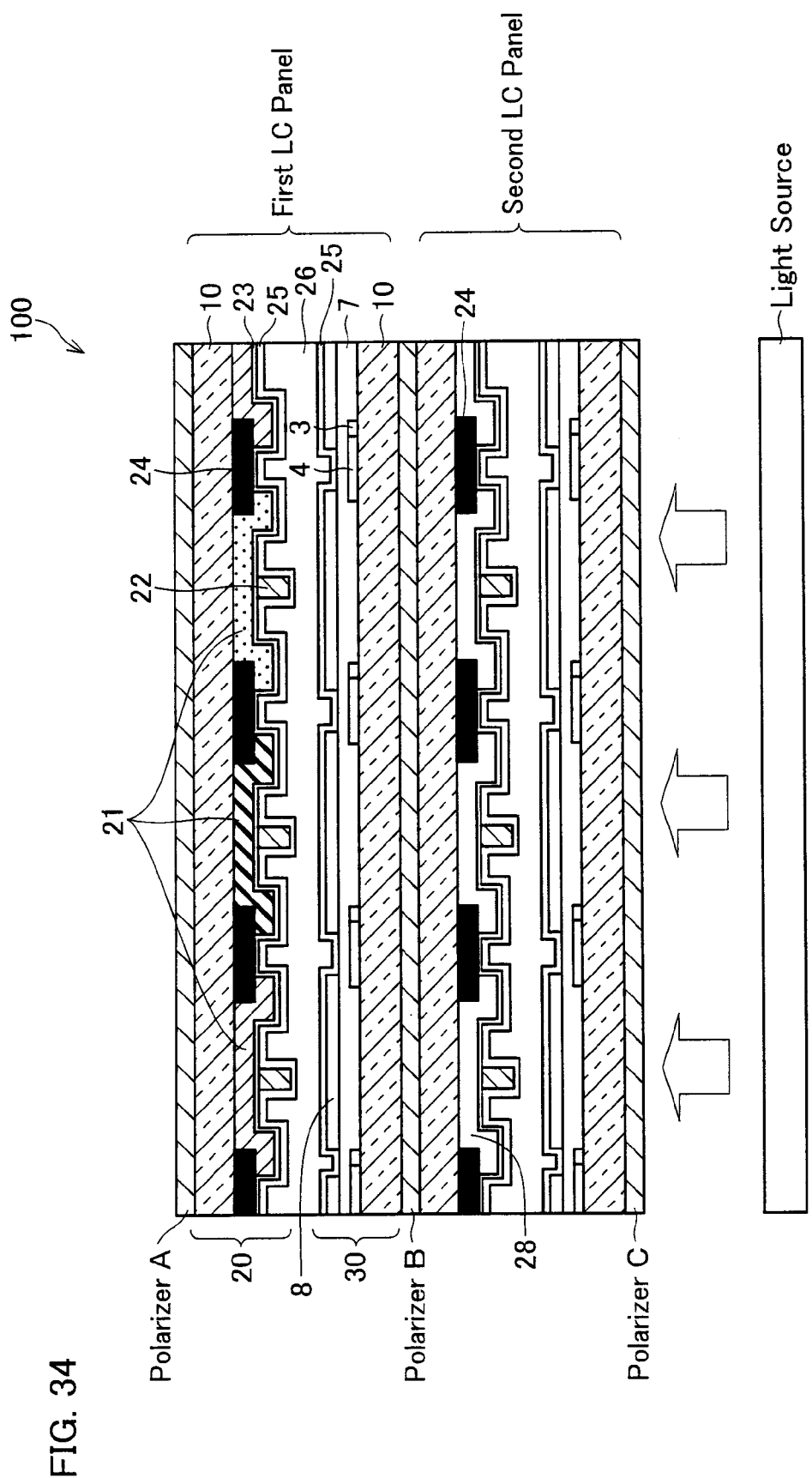
FIG. 34 is a schematic cross-sectional view of a liquid crystal display according to a further preferred embodiment of the present invention.

In reference to FIG. 34, another example of preferred embodiments of the present embodiment will be described. FIG. 34 is a schematic cross-sectional view of a liquid crystal display of a preferred embodiment in accordance with the present invention.

The example has the same objective of preventing alignment from being disturbed by the thick resin BM 24 as the liquid crystal display 100 shown in FIG. 33. A planarization film 28 is used in this example.

The planarization film 28 is used to reduce steps, and hence surface irregularities. The planarization film 28 is formed by applying and curing a material called a planarization material or overcoat material. There are a variety of planarization materials or overcoat materials available on the market. Some of them have high planarizing capability and high transparence. Some of the materials do not require use of a photomask and facilitates exposure and development when compared to the liquid crystal display 100 shown in FIG. 33.

The use of the planarization film 28 as the thick resin BM 24 reduces the steps formed by the resin BM and prevents alignment from being disturbed along the edge of the resin BM.

Accordingly, moire pattern occurrences attributable to alignment disturbance are prevented.

As discussed above, the present preferred embodiment reliably reduces moire pattern occurrences even if two liquid crystal display panels are stacked, improving on light transmittance and resulting in high luminance.

If the hot cathode fluorescent lamps described in embodiment 2 are used as the light source in the liquid crystal displays disclosed in the present preferred embodiment, luminance may be further improved.

If hot cathode fluorescent lamps are used, those cooling devices which were described in the first and second preferred embodiments are preferably used.

Fourth Preferred Embodiment

In the present preferred embodiment, the dimensions of a single dot in the panel containing no color filter (hereinafter, the "black and white panel") may be 3 times as long (n=3) in the direction of the gate bus lines and as long (m=1) in the direction of the source bus lines as a single dot in the panel containing a color filter (hereinafter, the "color panel").

The structure reduces the source drivers to ⅓ in number, hence related cost.

Figure 35:
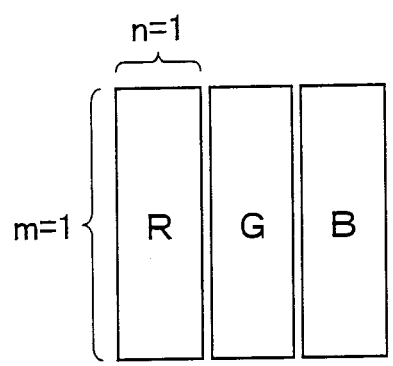
FIG. 35 illustrates a pixel used to produce a color display on a liquid crystal display.

If both panels have a color filter, there is one dot for each RGB in each panel as shown in FIG. 35. In contrast, if only one of the panels has a color filter, there is no need to form a color filter in the remaining panel in which the dimensions of a single dot are changed to 3 times as long (n=3) in the direction of the gate bus lines and as long (m=1) in the direction of the source bus lines as the single dot shown in FIG. 35. See FIG. 36.

Each dot in the black and white panel structured as described above is driven to be equal to a maximum gray level in the gray level data for the corresponding three dots in the color panel.

Figure 37:
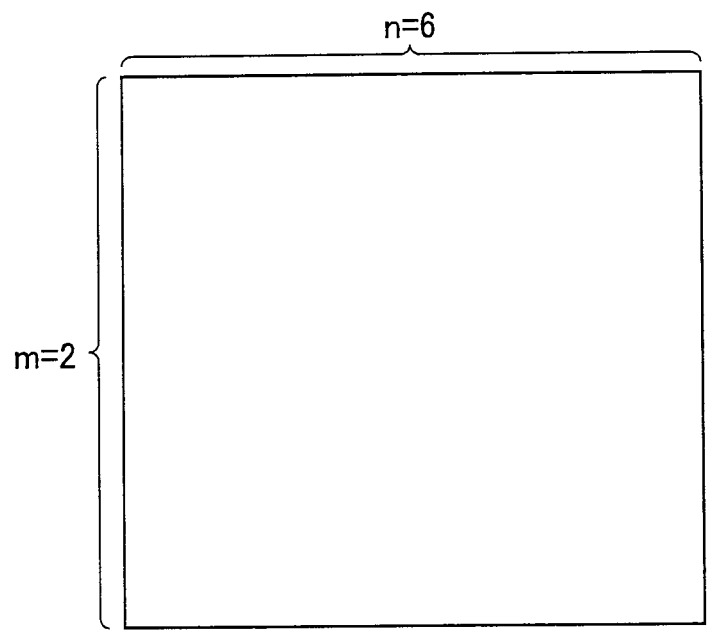
FIG. 37 illustrates an expanded pixel that is twice as large as the pixel shown in FIG. 36.

In another example of the present preferred embodiment, the dot dimensions of the black and white panel are determined so that n=6 and m=2 as shown in FIG. 37. That reduces the size of the source driver to ⅙ and the size of the gate driver to ½.

Each dot in the black and white panel structured as above is driven to be equal to a maximum gray level in the gray level data for the corresponding 12 dots in the color level.

Since only one of the two panels contains a color filter as described in the foregoing, there is no need to form a color filter in the other panel. That reduces related cost.

In the one of the two panels which contains no color filter, the opposite substrate facing the active matrix substrate 30 may include at least a black matrix. The inclusion lowers off leak current in the TFT elements 3 in the active matrix substrate 30.

The black matrix may include a light-transmitting resin layer around its openings. When that is the case and if the BM is made of resin, the arrangement prevents alignment from being disturbed at the edges of the BM by the large thickness.

A light-transmitting resin layer (planarization film) may be included so that they layer can cover the black matrix and the openings in the black matrix.

When that is the case and if the BM is made of resin, the arrangement prevents alignment from being disturbed at edges of the BM by the large thickness. Besides, the exposure and development process using a mask may be omitted.

Figure 36:
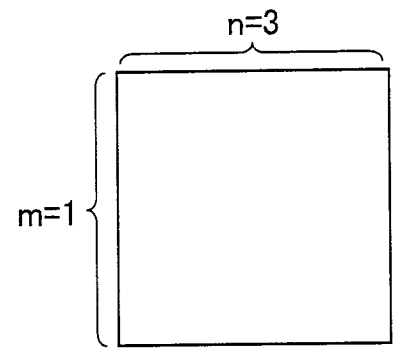
FIG. 36 illustrates a single pixel that is the same size as the pixel shown in FIG. 35.

As describe in the third preferred embodiment above in reference to FIGS. 35 to 37, in the present preferred embodiment, the dimensions of a single dot in the panel containing no color filter (hereinafter, the "black and white panel") may be 3 times as long (n=3) in the direction of the gate bus lines and as long (m=1) in the direction of the source bus lines as a single dot in the panel containing a color filter (hereinafter, the "color panel").

The present invention reduces the source drivers to ⅓ in number, hence related cost.

Each dot in the black and white panels of various preferred embodiments of the present invention is driven to be equal to a maximum gray level in the gray level data for the corresponding three dots in the color panel.

In another preferred embodiment, the dot dimensions of the black and white panel are determined so that n=6 and m=2.

The present preferred embodiment reduces the size of the source driver to ⅙ and the size of the gate driver to ½.

Each dot in the black and white panel of various preferred embodiments of the present invention is driven to be equal to a maximum gray level in the gray level data for the corresponding 12 dots in the color panel.

Figure 38:
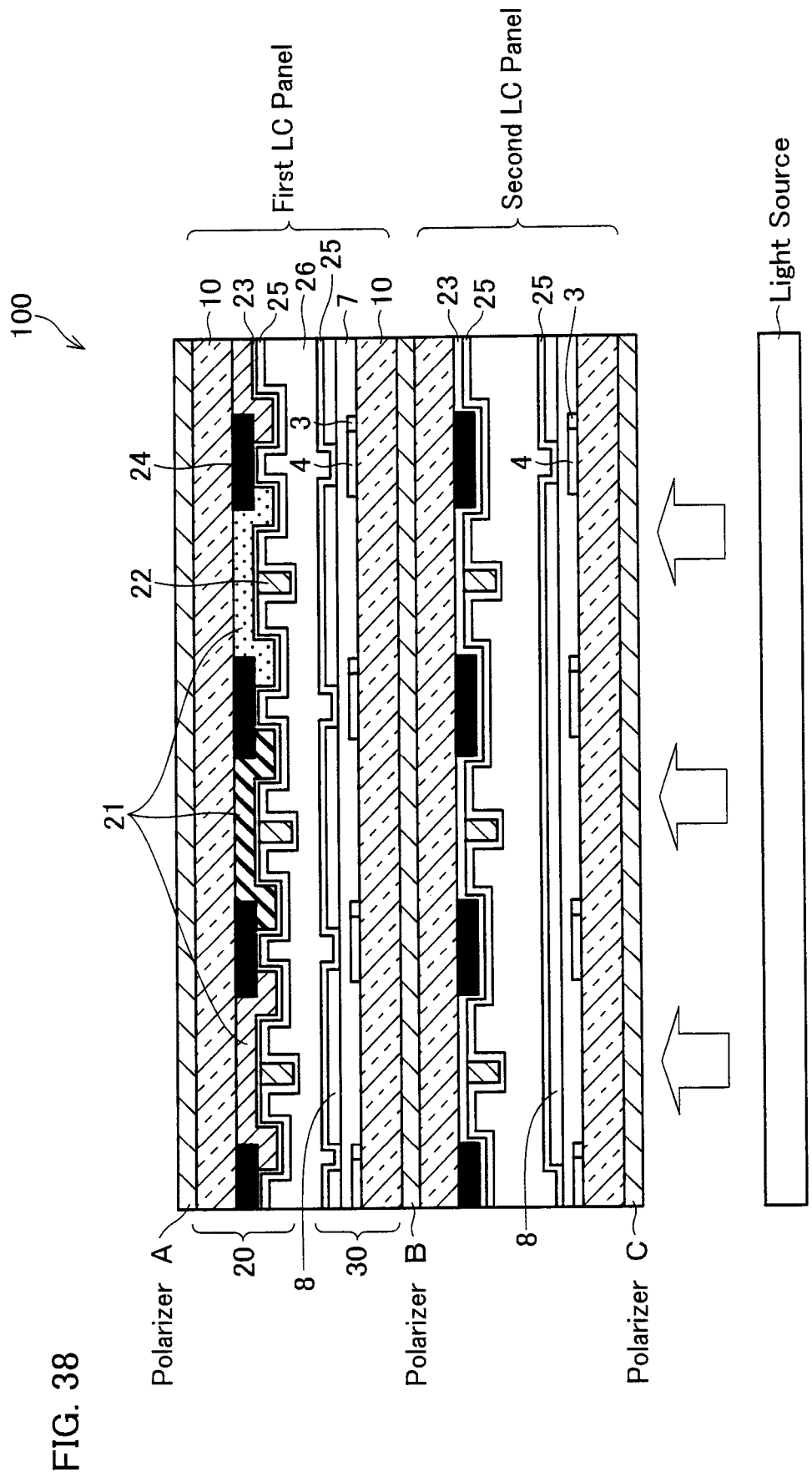
FIG. 38 is a schematic cross-sectional view of a liquid crystal display, illustrating another preferred embodiment of the present invention.

A specific liquid crystal display 100, as shown in FIG. 38, is configured so that the size of the pixel electrode 8 in the second liquid crystal panel is 3 times the size of the pixel electrode 8 in the first liquid crystal panel.

Figure 39:
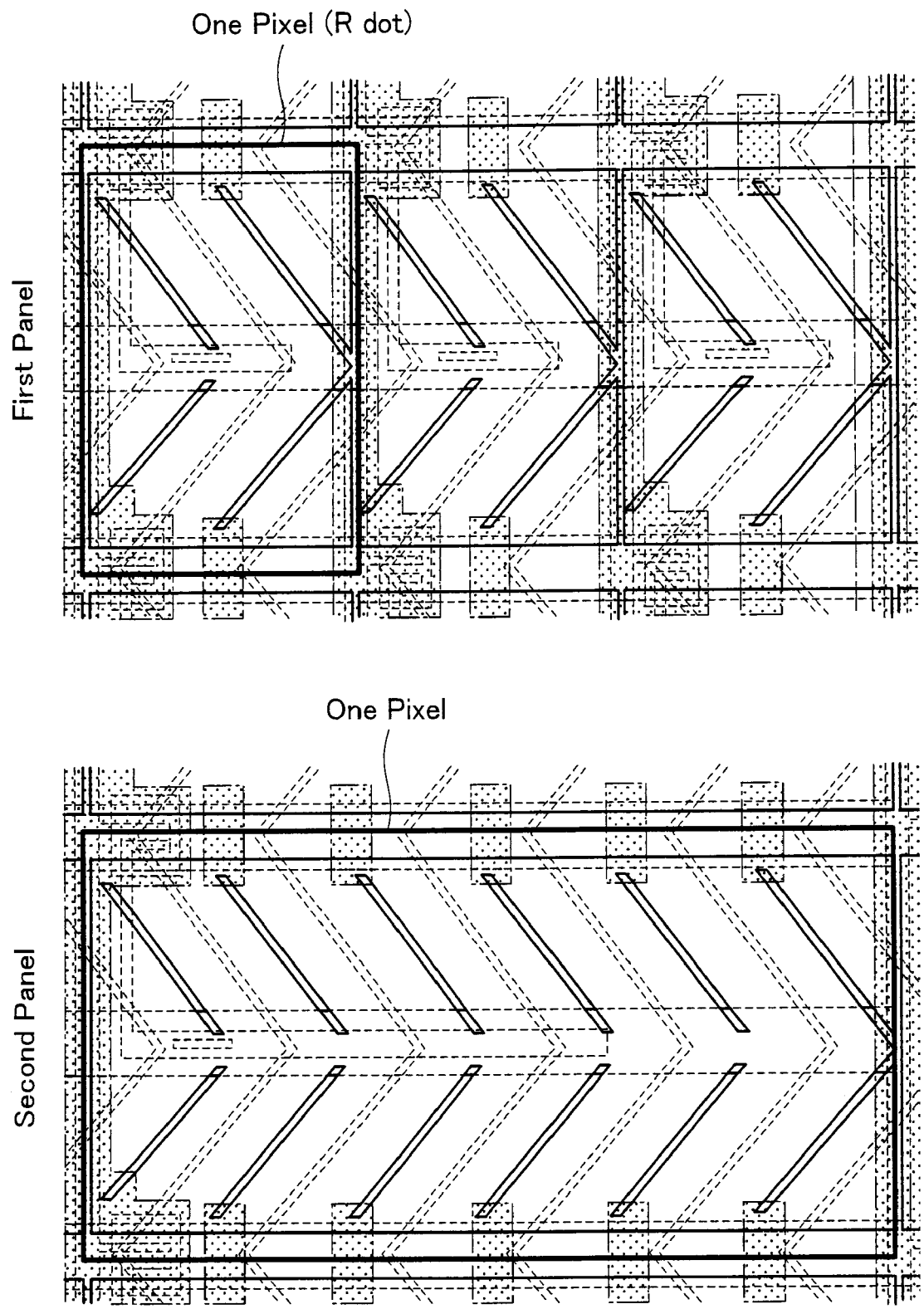
FIG. 39 is a plan view of pixels in the liquid crystal display shown in FIG. 38.

In other words, as shown in FIG. 39, on the active matrix substrate 30 of the first liquid crystal panel, a dot is formed corresponding to each RGB, and three dots forms a pixel for displaying the same video signal. On the active matrix substrate 30 of the second liquid crystal panel, a pixel 3 times the size of one pixel on the first liquid crystal panel is a pixel.

As described in the foregoing, moire pattern occurrences attributable to the settings of the minimum dots of the black and white panel to a multiple of RGB are prevented.

Luminance may be further improved by using hot cathode fluorescent lamps described in the second preferred embodiment as the light source used in the liquid crystal displays disclosed in the present preferred embodiment.

If hot cathode fluorescent lamps are used, those cooling devices which were described in the first and second preferred embodiments are preferably used.

Fifth Preferred Embodiment

Figure 40:
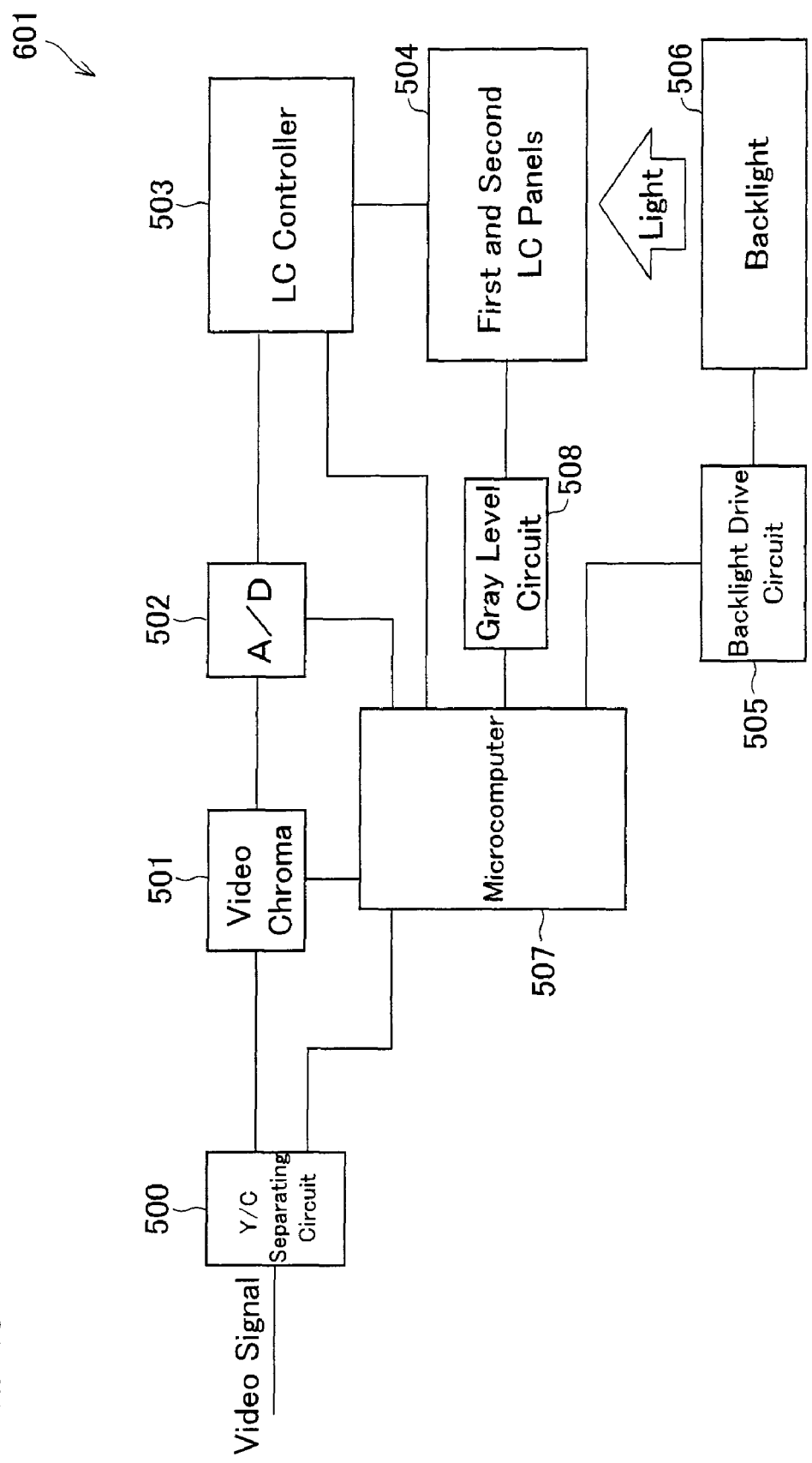
FIG. 40 is a schematic block diagram of a television receiver incorporating the liquid crystal display according to a preferred embodiment of the present invention.
Figure 41:
FIG. 41 is a block diagram illustrating a relationship between a tuner section and a liquid crystal display in the television receiver shown in FIG. 40.
Figure 42:
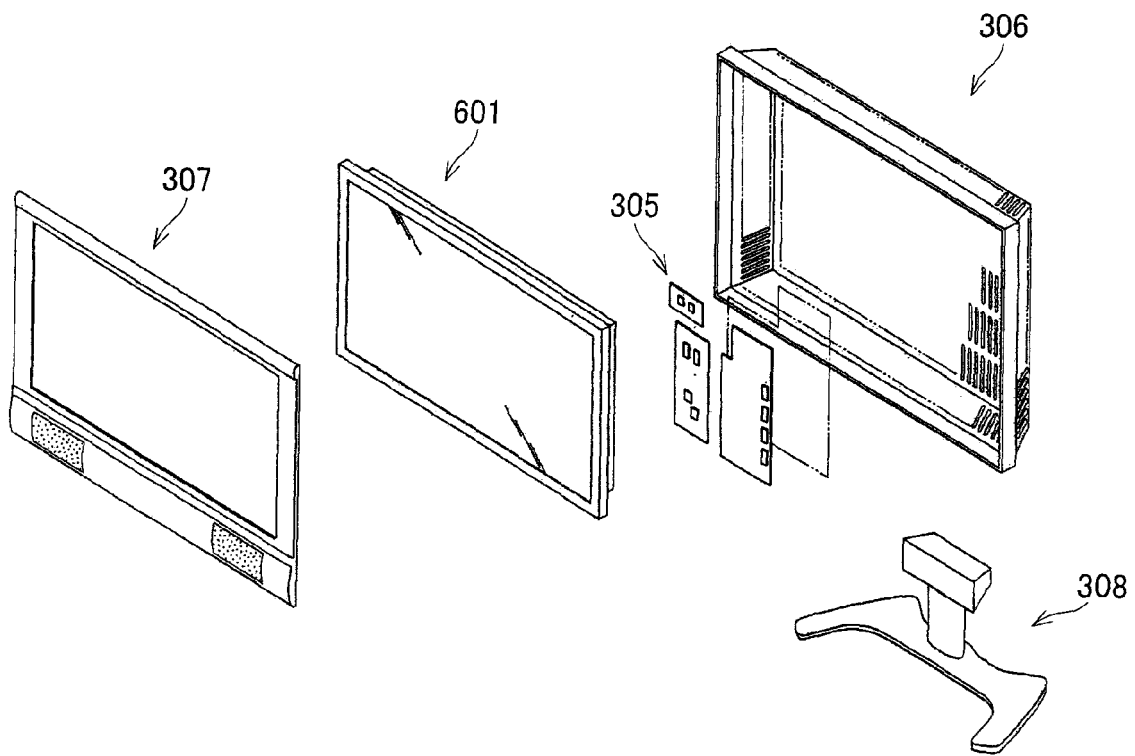
FIG. 42 is an exploded perspective view of the television receiver shown in FIG. 40.

Referring to FIGS. 40 to 42, the following will describe the television receiver to which the liquid crystal display according to various preferred embodiments of the present invention is applied.

FIG. 40 shows circuit blocks of a liquid crystal display 601 for the television receiver.

The liquid crystal display 601 includes, as shown in FIG. 40, a Y/C separating circuit 500, a video chroma circuit 501, an A/D converter 502, a liquid crystal controller 503, liquid crystal panels 504, a backlight drive circuit 505, a backlight 506, a microcomputer 507, and a gray level circuit 508.

The liquid crystal panels 504 preferably have a double panel structure including a first liquid crystal panel and a second liquid crystal panel. The panels may be of any of the structures described in the foregoing preferred embodiments.

In the liquid crystal display 601 arranged as above, first, an input video signal (television signal) is supplied to the Y/C separating circuit 500 where the signal is separated into a luminance signal and a color signal. The luminance and color signals are converted to R, G, B, or the three primary colors of light, in the video chroma circuit 501. Furthermore, the analog RGB signals are converted to digital RGB signals by the A/D converter 502 for output to the liquid crystal controller 503.

The liquid crystal panels 504 are fed with the RGB signal from the liquid crystal controller 503 at predetermined timings and also with RGB gray level voltages from the gray level circuit 508. From these signals, the panels 504 output images. The control of the system overall, including the foregoing processes, is performed by the microcomputer 507.

Various video signals may be used for display, including a video signal based on television broadcast, a video signal representing images captured on a camera, or a video signal fed over the Internet.

Furthermore, in FIG. 41, a tuner section 600 receives television broadcast and outputs a video signal. A liquid crystal display 601 displays images (video) based on the video signal supplied from the tuner section 600.

If the liquid crystal display arranged as above is a television receiver, for example, the display is structured so that the liquid crystal display 601 is sandwiched by and enclosed in a first housing 301 and a second housing 306 as shown in FIG. 42.

An opening 301a is formed through the first housing 301. The video display produced on the liquid crystal display 601 is visible through the opening 301a.

The second housing 306 provides a cover for the back of the liquid crystal display 601. The housing 306 is provided with an operation circuit 305 for operation of the liquid crystal display 601. The housing 306 has a support member 308 attached to its bottom.

The present invention is not limited to the description of the preferred embodiments above, but may be altered by a skilled person within the scope of the claims. An embodiment based on a proper combination of technical means disclosed in different preferred embodiments is encompassed in the technical scope of the present invention.

The liquid crystal display of the present invention delivers greatly improved contrast and is therefore suitably applicable, for example, to television receivers and broadcast monitors.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A liquid crystal display, comprising:
    at least two stacked liquid crystal panels including a first liquid crystal panel arranged to produce a display from a first display signal and a second liquid crystal panel arranged to produce a display from a second display signal obtained from the first display signal;
    polarized light absorbing layers arranged to define crossed Nicols across the at least two liquid crystal panels; and
    at least one cooling device arranged to cool the liquid crystal display.

2. The liquid crystal display of claim 1, wherein the at least one cooling device is arranged to cool at least one of the stacked first and second liquid crystal panels.

3. The liquid crystal display of claim 2, wherein the at least one cooling device includes a device arranged to generate an air flow outside a display active area along the display active area defined by stacking the first and second liquid crystal panels.

4. The liquid crystal display of claim 2, wherein the at least one cooling device includes a circulation device arranged to circulate a transparent fluid in a space between the stacked first and second liquid crystal panels.

5. The liquid crystal display of claim 2, wherein the cooling device includes a vent arranged to vent air from between the stacked first and second liquid crystal panels to outside.

6. The liquid crystal display of claim 2, further comprising a lighting system for supplying display light to the stacked liquid crystal panels from behind the liquid crystal panels, wherein the cooling device includes a circulation device arranged to circulate a transparent fluid in a space between the stacked liquid crystal panels and the lighting system.

7. The liquid crystal display of claim 6, wherein the light source for the lighting system includes hot cathode fluorescence lamps.

8. The liquid crystal display of claim 2, further comprising a lighting system for supplying display light to the stacked liquid crystal panels from behind the liquid crystal panels, wherein the cooling device includes a vent arranged to vent air from a space between the stacked liquid crystal panels and the lighting system to outside.

9. The liquid crystal display of claim 1, further comprising:
a lighting system for supplying display light to the first and second liquid crystal panels; and
a lighting system cooling device arranged to cool the lighting system.

10. The liquid crystal display of claim 9, wherein:
the lighting system includes a reflection layer surrounding a light source; and
an optical member, disposed on a display plane side, achieves a predetermined optical effect under light from the light source and the reflection layer;
the lighting system cooling device includes a vent arranged to vent air from around the light source surrounded by the reflection layer and the optical member of the lighting system.

11. The liquid crystal display of claim 1, further comprising a drive circuit cooling device arranged to cool a drive circuit driving the first and second liquid crystal panels.

12. The liquid crystal display of claim 1, wherein only one of the first and second liquid crystal panels includes a color filter.

13. The liquid crystal display of claim 12, wherein:
the liquid crystal panel containing no color filter includes an active matrix substrate; and
an opposite substrate facing the active matrix substrate includes at least a black matrix.

14. The liquid crystal display of claim 13, wherein the opposite substrate includes a light-transmitting resin layer around openings in the black matrix.

15. The liquid crystal display of claim 14, wherein the light-transmitting resin layer covers the black matrix and the openings in the black matrix.

16. The liquid crystal display of claim 13, wherein the liquid crystal panel containing no color filter includes dots each having a size n×m times that of each dot of the liquid crystal panel containing the color filter, where n, m are real numbers, at least either one of n and m is greater than 1, n is a ratio taken parallel to gate bus lines, and m is a ratio taken parallel to source bus lines.

17. The liquid crystal display of claim 12, wherein:
the liquid crystal panel containing the color filter includes a matrix of pixels each including a red dot, a green dot, and a blue dot; and
the liquid crystal panel containing no color filter includes a matrix of pixels of a size that is an integral multiple of that of the pixels of the liquid crystal panel containing the color filter.

18. The liquid crystal display of claim 12, further comprising a display controller arranged to supply gray level data as display signals to the liquid crystal panels to control displays on the liquid crystal panels, wherein the display controller controls so that gray level data for one dot of the liquid crystal panel containing no color filter is maximum gray level data for n×m corresponding dots of the liquid crystal panel containing the color filter and also is gray level data represented by results of computing reflecting a maximum gray level, where n, m are real numbers, at least either one of n and m is greater than 1, n is a ratio taken parallel to gate bus lines, and m is a ratio taken parallel to source bus lines.

19. A television receiver, comprising:
a tuner section arranged to receive a television broadcast; and
a display arranged to display the television broadcast received by the tuner section;
the display being a liquid crystal display including at least two stacked liquid crystal panels including a first liquid crystal panel arranged to produce a display from a first display signal and a second liquid crystal panel arranged to produce a display from a second display signal obtained from the first display signal; polarized light absorbing layers arranged to define crossed Nicols across the at least two liquid crystal panels; and a cooling device arranged to cool the liquid crystal display.

* * * * *